US011205159B2

(12) United States Patent
Colena

(10) Patent No.: US 11,205,159 B2
(45) Date of Patent: Dec. 21, 2021

(54) USING CONSTRAINT PROGRAMMING TO OBTAIN A MACHINE MAINTENANCE SCHEDULE FOR MAINTAINING MACHINES

(71) Applicant: Oracle International Corporation, Redwood Shores, CA (US)

(72) Inventor: Michael Patrick Colena, Hollis, NH (US)

(73) Assignee: Oracle International Corporation, Redwood Shores, CA (US)

( * ) Notice: Subject to any disclaimer, the term of this patent is extended or adjusted under 35 U.S.C. 154(b) by 120 days.

(21) Appl. No.: 16/405,638

(22) Filed: May 7, 2019

(65) Prior Publication Data

US 2020/0074412 A1 Mar. 5, 2020

Related U.S. Application Data

(60) Provisional application No. 62/723,945, filed on Aug. 28, 2018.

(51) Int. Cl.
*G06Q 10/00* (2012.01)
*G06Q 10/06* (2012.01)
(Continued)

(52) U.S. Cl.
CPC ............. *G06Q 10/20* (2013.01); *G06N 7/005* (2013.01); *G06Q 10/067* (2013.01); *G06Q 10/1097* (2013.01)

(58) Field of Classification Search
CPC .. G06Q 10/20; G06Q 10/067; G06Q 10/1097; G06Q 10/0633; G06Q 10/06311;
(Continued)

(56) References Cited

U.S. PATENT DOCUMENTS 6,662,167 B1 12/2003 Xiao
7,092,894 B1 8/2006 Crone
(Continued)

OTHER PUBLICATIONS

Peng et al., "A Constraint Programming Method for Advanced Planning and Scheduling System with Multilevel Structured Products," Hindawi Publishing Corp., vol. 24, Article ID 917685, 7 pages.
(Continued)

*Primary Examiner* — Charles Guiliano
*Assistant Examiner* — Letoria G Knight
(74) *Attorney, Agent, or Firm* — Invoke

(57) ABSTRACT

Using constraint programming (CP) to obtain a machine maintenance schedule is described. A data model generator generates a CP data model, including a set of task elements representing a set of maintenance tasks, and a set of time elements representing a set of time windows. The CP data model further includes a constraint that requires each task element to be assigned a time window from a respective domain, such that each time element is assigned a task count from a respective domain. A search directive generator generates a CP search directive, including applying different time window prioritization methods to maintenance tasks for machines having different failure probabilities. One prioritization method may prioritize time windows based on delinquency costs. Another prioritization method may prioritize time windows based on a current maintenance schedule. A CP solver determines a proposed maintenance schedule based on the CP data model and the CP search directive.

20 Claims, 11 Drawing Sheets

(51) Int. Cl.
*G06Q 10/10* (2012.01)
*G06N 7/00* (2006.01)

(58) Field of Classification Search
CPC ... G06N 7/005; G06F 16/9535; G06F 3/0482; G05B 23/0283; G05B 2219/32224; G05B 2219/32234
See application file for complete search history.

(56) References Cited

U.S. PATENT DOCUMENTS

| | | | |
|---|---|---|---|
| 7,447,669 B2 | 11/2008 | Zhu | |
| 7,991,633 B2 | 8/2011 | Baker et al. | |
| 8,560,368 B1* | 10/2013 | Maity | G06Q 10/20 705/7.13 |
| 8,583,467 B1 | 11/2013 | Morris et al. | |
| 8,869,165 B2* | 10/2014 | Dasgupta | G06F 9/5038 718/106 |
| 2002/0049563 A1 | 4/2002 | Vetter et al. | |
| 2003/0055666 A1* | 3/2003 | Roddy | G06Q 10/06395 705/305 |
| 2005/0187721 A1* | 8/2005 | Baust | G06Q 10/00 702/34 |
| 2007/0011035 A1 | 1/2007 | Ofir | |
| 2008/0288321 A1* | 11/2008 | Dillon | G06Q 10/06311 705/7.13 |
| 2011/0029984 A1* | 2/2011 | Norman | G06Q 10/06 718/106 |
| 2012/0017216 A1* | 1/2012 | Chan | H04W 4/70 718/102 |
| 2012/0110584 A1* | 5/2012 | Chaudhry | G06F 9/5027 718/102 |
| 2014/0142998 A1* | 5/2014 | Kroeger | G06Q 10/06311 705/7.13 |
| 2017/0091688 A1* | 3/2017 | Lopes | G06Q 10/06314 |
| 2019/0080615 A1* | 3/2019 | Small | G08G 5/0082 |
| 2020/0019935 A1* | 1/2020 | Jan | G06N 20/20 |

OTHER PUBLICATIONS

Smith, "A Tutorial on Constraint Programming", School of Computer Studies Research Report Series, University of Leeds, Report 95.14, Apr. 1995, 22 pages.
Muller et al., "Minimal Perturbation Problem in Course Timetabling", 2005. pp. 126-146.
Milano et al., "Constraint Programming", Contributi Scientific, 2006, 6 pages.
Lindgren et al., "Improving the Maintenance Planning of Heavy Trucks using Constraint Programming", 2013, 17 pages.
Krogt et al., "Scheduling in the Real World: Lessons Learnt", 2009, 7 pages.
Junker et al., "Preference-based Search for Minimizing Changes in Rescheduling Problems". In: IJCAI—99 Workshop on scheduling and planning meet real-time: Monitoring in a dynamic and uncertain world, 1999, pp. 39-45.
Hladik et al., "Dynamic Constraint Programming for Solving Hard Real-Time Allocation Problems", Jan. 2015, pp. 1-19.
Frost et al., "Constraint Processing for Optimal Maintenance Scheduling", An Electric Power Research Institute final report, Feb. 1998, pp. 1-40.
Elkhyari et al., "Constraint Programming for Dynamic Scheduling Problems", May 2004, 6 pages.
Brucker et al., "Resource-Constrained Project Scheduling and Timetabling", 2001, pp. 277-293.

* cited by examiner

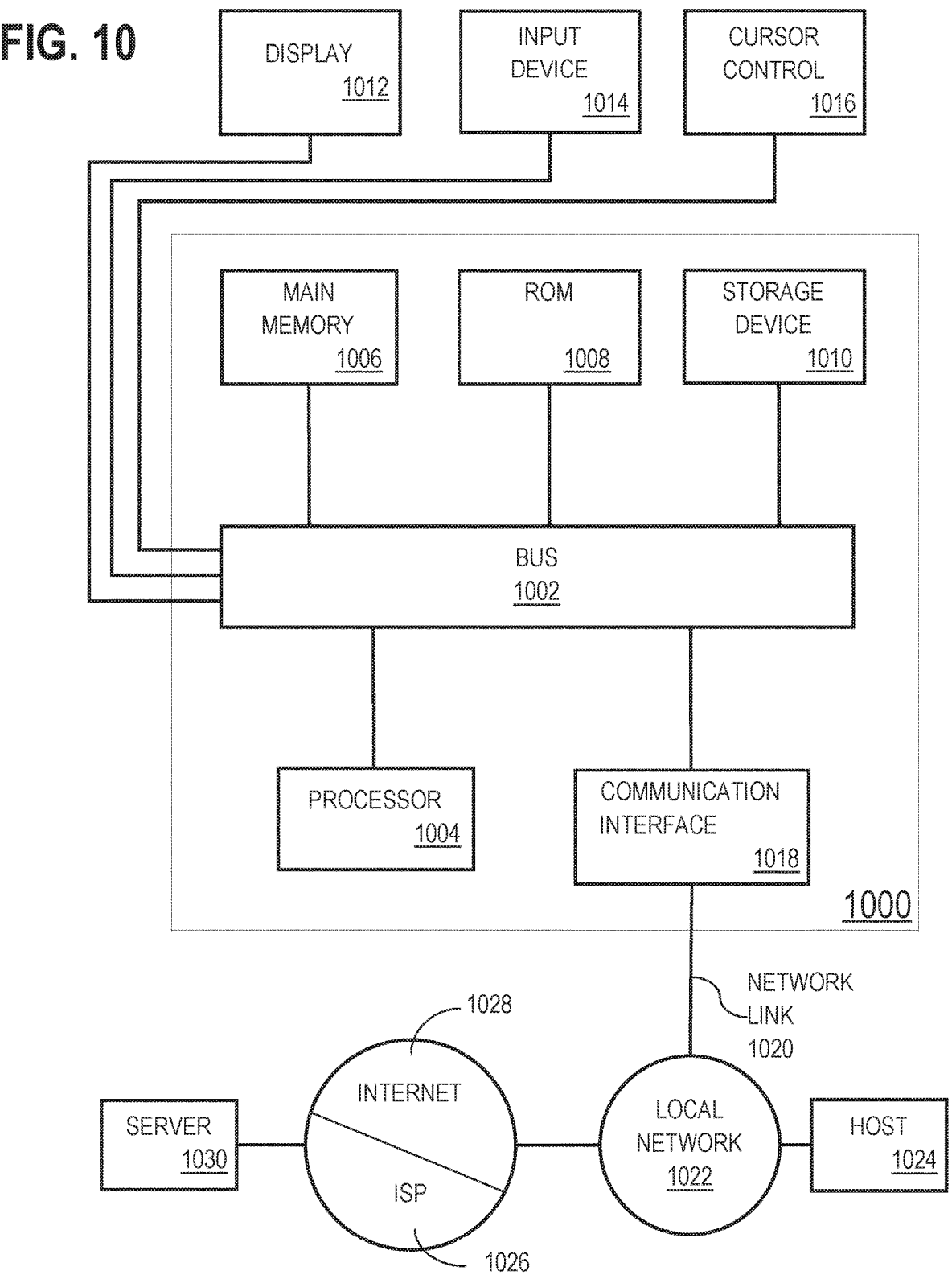

USING CONSTRAINT PROGRAMMING TO OBTAIN A MACHINE MAINTENANCE SCHEDULE FOR MAINTAINING MACHINES

INCORPORATION BY REFERENCE; DISCLAIMER

The following application is hereby incorporated by reference: application no. 62/723,945 filed on Aug. 28, 2018. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to the use of constraint programming. In particular, the present disclosure relates to using constraint programming to obtain a machine maintenance schedule for maintaining machines.

BACKGROUND

A machine is a hardware apparatus configured to perform one or more functions. Examples of machines include factory machines (such as manufacturing machines), trucks, and computing devices.

A machine generally needs maintenance service from time to time in order to maintain the machine's operation and/or efficiency. A machine may be associated with a default maintenance schedule that is specified by a machine manual and/or a machine manufacturer. However, the actual maintenance needs of a machine may change depending on various factors, such as actual usage duration, actual production levels, operating conditions, and/or operating errors.

If a machine is maintained based on a default maintenance schedule, rather than the machine's actual maintenance needs, the machine may fail before a necessary maintenance task is performed. The machine's failure may require additional resources to be repaired, thereby resulting in prolonged downtime. Additionally, the machine's failure may be an unexpected interruption of the machine's functions, causing ripple effects in the production chain.

Moreover, if a machine is maintained based on a default machine schedule, the machine may be serviced even though the machine's risk of failure is very low. Performing unnecessary maintenance results in unnecessary downtime for the machine.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 10 shows a block diagram that illustrates a computer system in accordance with one or more embodiments.

DETAILED DESCRIPTION

Figure 1:
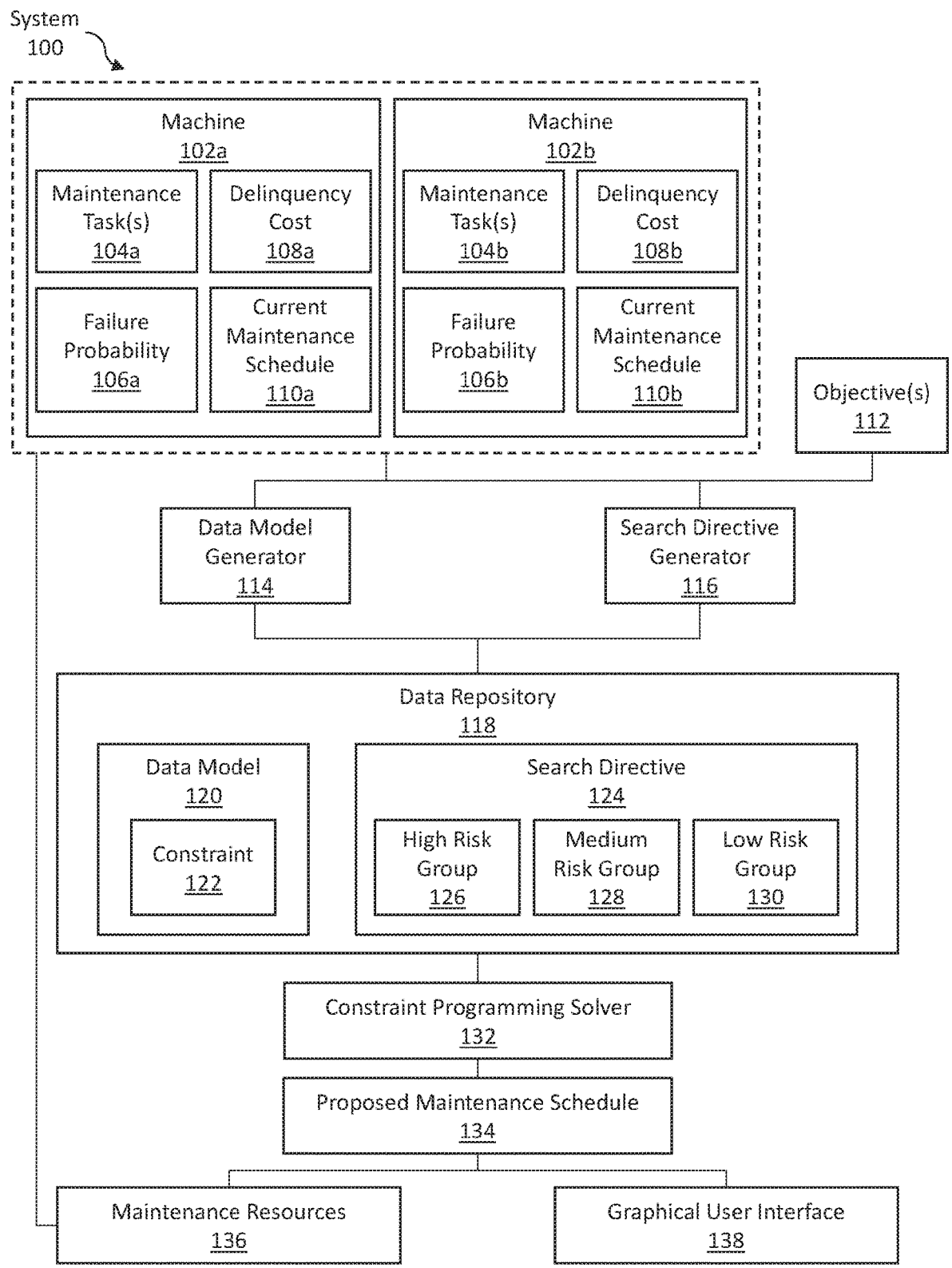
FIG. 1 illustrates a constraint programming data model and search directive generation system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. CONSTRAINT PROGRAMMING DATA MODEL AND SEARCH DIRECTIVE GENERATION SYSTEM ARCHITECTURE
3. GENERATING A CONSTRAINT PROGRAMMING DATA MODEL AND SEARCH DIRECTIVE FOR OBTAINING A PROPOSED MAINTENANCE SCHEDULE
   A. DETERMINING A SET OF MACHINES, MAINTENANCE TASKS, AND RELATED INFORMATION
   B. DETERMINING A CONSTRAINT PROGRAMMING DATA MODEL
   C. DETERMINING A CONSTRAINT PROGRAMMING SEARCH DIRECTIVE
   D. APPLYING A CONSTRAINT PROGRAMMING DATA MODEL AND SEARCH DIRECTIVE TO A CONSTRAINT PROGRAMMING SOLVER
4. GRAPHICAL USER INTERFACE FOR PRESENTING A PROPOSED MAINTENANCE SCHEDULE
5. HARDWARE OVERVIEW

6. MISCELLANEOUS; EXTENSIONS

1. General Overview

One or more embodiments include using constraint programming (CP) to obtain a proposed maintenance schedule for performing a set of maintenance tasks for a set of machines.

Constraint programming (CP) is a form of declarative programming. CP obtains a solution to a real-world problem based on a specification of a CP data model and a CP search directive. In contrast, imperative programming is based on a specification of a sequence of steps.

A CP data model includes a set of data model elements; domains of possible values that can be assigned to each element; and one or more constraints that define combinations of values that are allowed to be assigned to the elements. Based on the CP data model, a set of values for the set of elements that satisfies all constraints is determined. A set of values for the set of elements that satisfies all constraints may be referred to herein as a "CP solution."

A CP search directive guides the assignment a set of values to a set of data model elements that satisfies all constraints, as specified by a CP data model. The CP search directive prioritizes the assignment of certain values over other values for one or more elements. Different CP search directives for a same CP data model may result in different CP solutions.

CP is a more efficient way (than imperative programming) for obtaining a proposed maintenance schedule for performing a set of maintenance tasks for a set of machines, while satisfying one or more of the following objectives:
(a) limiting time windows during which each maintenance task may be performed;
(b) limiting a number of maintenance tasks that may be performed during each time period;
(c) prioritizing maintenance of machines with a greater failure probability over machines with a lesser failure probability; and/or
(d) minimizing disturbance of a current maintenance schedule to the extent possible.

CP is more efficient because, as further described below, (a) a CP data model that includes a single constraint is sufficient for obtaining a proposed maintenance schedule that satisfies multiple objectives, and (b) a CP search directive clearly delineates which time windows are prioritized for which maintenance tasks in accordance with the multiple objectives. In contrast, solving the problem with multiple objectives using imperative programming would involve a large number of steps. If there is any change to attributes of the problem (such as, how much to prioritize maintenance of machines with a greater failure probability over machines with a lesser failure probability), there are only a few factors to adjust in CP: the data model elements, the constraint, and/or the search directives. In contrast, imperative programming would require changes to a large number of steps. Hence, CP is highly scalable to adapt to various objectives of different problems.

One or more embodiments include generating a CP data model for obtaining a proposed maintenance schedule for performing a set of machine maintenance tasks, while satisfying the one or more objectives as described above. The CP data model includes (a) a set of task elements representing a set of maintenance tasks, and (b) a set of time elements representing a set of time windows. Each domain of a task element represents time windows available for performing the maintenance task corresponding to the task element. Each domain of a time element represents task counts permitted during the time window corresponding to the time element. The CP data model further includes a constraint that requires each task element to be assigned a time window from the respective domain, such that each time element is assigned a task count from the respective domain.

One or more embodiments include generating a CP search directive for obtaining a proposed maintenance schedule for performing a set of machine maintenance tasks, while satisfying the one or more objectives as described above. The CP search directive includes applying different time window prioritization methods to maintenance tasks for machines having different failure probabilities. The CP search directive includes assigning one of the earliest available time windows to maintenance tasks for machines associated with greatest failure probabilities. Additionally or alternatively, the CP search directive includes assigning one of the latest available time windows to maintenance tasks for machines associated with lowest failure probabilities. Additionally or alternatively, the CP search directive includes assigning a time window associated with a lower delinquency cost, rather than a time window associated with a higher delinquency cost, to a maintenance task. Additionally or alternatively, the CP search directive includes assigning a time window closer to a currently-scheduled time window, rather than a time window farther from the currently-scheduled time window, to a maintenance task.

One or more embodiments include applying a CP data model and a CP search directive to a CP solver to obtain a proposed maintenance schedule. A graphical user interface (GUI) presents the proposed maintenance schedule to one or more users. A GUI may overlay the proposed maintenance schedule on top of the current maintenance schedule. Additionally or alternatively, maintenance resources obtain the proposed maintenance schedule. The maintenance resources perform the maintenance tasks according to the proposed maintenance schedule. The maintenance tasks may be performed with or without human intervention.

The choice of generating a CP data model with only one constraint allows a user to easily tailor a CP search directive based on the objectives that need to be satisfied. Objectives may change from time to time, and/or from user to user. As an example, one user may desire maintenance tasks for machines associated with greatest failure probabilities to be performed within the first two earliest available days. Another user may desire maintenance tasks for machines associated with greatest failure probabilities to be performed within the first five earliest available days. Each user may tailor the CP search directive to satisfy respective objectives.

Rather than applying a single time window prioritization method, the CP search directive includes different time window prioritization methods to maintenance tasks for machines having different failure probabilities. Maintenance tasks for machines having different failure probabilities are treated differently. As an example, time windows for maintenance tasks for machines associated with greatest failure probabilities may be assigned without regard to currently-scheduled time windows. In contrast, time windows for maintenance tasks for other machines may be assigned to be as close to currently-scheduled time windows as possible. Hence, machines with greatest failure probabilities may be serviced first, thereby reducing the risk of machine failure.

The above approach improves a CP solver's ability to determine a proposed maintenance schedule for performing a set of maintenance tasks for a set of machines, while satisfying one or more objectives. Based on a CP data model and a CP search directive, as described above, the CP solver may efficiently determine the proposed maintenance schedule. Without the CP data model and the CP search directive, as described above, the CP solver is not able to determine a proposed maintenance schedule that satisfies the objectives.

The above approach further improves maintenance of a set of machines, and thereby improves the capability of the machines. Without generating a proposed maintenance schedule, machines may be serviced based on default maintenance schedules, without regard to factors that may alter a machine's maintenance needs. Generating a proposed maintenance schedule takes into account the machines different failure probabilities and schedules maintenance tasks accordingly. Therefore, the risk of machine failure is reduced. The machines may operate at optimum levels of efficiency.

The above approach further improves a GUI for presenting maintenance schedules. Rather than presenting only the current maintenance schedule, or only the proposed maintenance schedule, the GUI concurrently presents both the current maintenance schedule and the proposed maintenance schedule. The GUI overlays the proposed maintenance schedule on the current maintenance schedule. The GUI presents arrows indicating modifications from the current maintenance schedule to the proposed maintenance schedule. Therefore, a user may easily view the schedule modifications, and implement changes to maintenance resources as necessary.

One or more embodiments described in this Specification and/or recited in the claims may not be included in this General Overview section.

2. Constraint Programming Data Model and Search Directive Generation System Architecture FIG. 1 illustrates a constraint programming data model and search directive generation system, in accordance with one or more embodiments. As illustrated in FIG. 1, a system 100 includes a set of machines 102*a-b*, one or more objectives 112, a data model generator 114, a search directive generator 116, a data repository 118, a constraint programming (CP) solver 132, a proposed maintenance schedule 134, maintenance resources 136, and a graphical user interface (GUI) 138. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a machine (such as any of machines 102*a-b*) is a hardware apparatus configured to perform one or more functions. Examples of machines include factory machines (such as manufacturing machines), trucks, and computing devices.

A machine is associated with one or more maintenance tasks, a failure probability, a delinquency cost, and/or a current maintenance schedule. As illustrated, for example, machine 102*a* is associated with one or more maintenance tasks 104*a*, failure probability 106*a*, delinquency cost 108*a*, and current maintenance schedule 110*a*. Machine 102*b* is associated with one or more maintenance tasks 104*b*, failure probability 106*b*, delinquency cost 108*b*, and current maintenance schedule 110*b*.

A maintenance task is a task for maintaining a machine. Different machines may be associated with different maintenance tasks. As an example, maintenance tasks for a factory machine may include performing a routine checkup, replacing gears, and changing oil. Maintenance tasks for a truck may include performing a routine checkup, rotating tires, and changing oil.

A failure probability is a probability that a machine will fail. A failure probability may be determined based on various factors. As an example, a failure probability may be determined based on data detected by one or more sensors associated with the machine. The sensors may be installed inside and/or adjacent to the machines. The sensors may detect, for example, a temperature and an air pressure within the machine. The temperature and air pressure may be input to an algorithm to determine the failure probability. The algorithm may be obtained using machine learning. As another example, a failure probability may be determined based on factors such as, a frequency, duration, and/or type of usage of the machine. A machine that has failed is no longer operable. A machine with a greater failure probability may also be less efficient than a machine with a lesser failure probability.

A delinquency cost is the cost of interrupting operation of a machine for maintenance during a particular time window. As an example, a delinquency cost may be a value and/or number of the products that a machine would produce if the machine were not stopped for performing a maintenance task. As another example, a delinquency cost may be a duration of time that a machine needs to be stopped for performing a maintenance task. If a machine need not be stopped for performing a maintenance task, then a delinquency cost would be zero. A machine is associated with different delinquency costs during different time windows. As an example, a machine may be scheduled to produce ten cups during 9:00-10:00 am. The machine may be scheduled to produce twenty plates during 10:00-11:00 a.m. The value of ten cups may be $10. The value of twenty plates may be $15. Hence, a delinquency cost for the machine at 9:00-10:00 am may be the value of ten cups, $10. A delinquency cost for the machine at 10:00-11:00 am may be the value of twenty plates, $15.

A current maintenance schedule is a schedule for performing one or more maintenance tasks that would be implemented if no modifications are made. A current maintenance schedule may be determined based on a default maintenance schedule. A default maintenance schedule is a maintenance schedule that is recommended by a machine manual and/or a machine manufacturer. Additionally or alternatively, a current maintenance schedule may be determined based on a prior execution of the operations described herein with reference to FIGS. 2-8. The current maintenance schedule may be determined based on a set of failure probabilities, a set of delinquency costs, and/or a maintenance schedule that were used during the prior execution of the operations as illustrated in FIGS. 2-8. The set of failure probabilities and/or delinquency costs may have been updated since the prior execution of the operations as illustrated in FIGS. 2-8.

In one or more embodiments, an objective 112 is a user-specified goal. A user desires that a proposed maintenance schedule 134 satisfies the objective 112. Examples of objectives include:

(a) limiting time windows during which each maintenance task may be performed;
(b) limiting a number of maintenance tasks that may be performed during each time period;
(c) prioritizing maintenance of machines with a greater failure probability over machines with a lesser failure probability; and/or (d) minimizing disturbance of a current maintenance schedule to the extent possible.

In one or more embodiments, a data repository 118 is any type of storage unit and/or device (e.g., a file system, database, collection of tables, or any other storage mechanism) for storing data. Further, a data repository 118 may include multiple different storage units and/or devices. The multiple different storage units and/or devices may or may not be of the same type or located at the same physical site. Further, a data repository 118 may be implemented or may execute on the same computing system as a data model generator 114 and/or search directive generator 116. Alternatively or additionally, a data repository 118 may be implemented or executed on a computing system separate from a data model generator 114 and/or search directive generator 116. The data repository 118 may be communicatively coupled to a data model generator 114 and/or search directive generator 116 via a direct connection or via a network.

Information describing a CP data model 120 and a CP search directive 124 may be implemented across any of components within the system 100. However, this information is illustrated within the data repository 118 for purposes of clarity and explanation.

In one or more embodiments, a CP data model 120 refers to a particular organization, structure, and/or representation of information stored within a data repository 118. A CP data model 120 may be implemented as a software data structure. The software data structure is readable by a machine. The CP data model 120 may include a set of instructions executable by one or more devices including a hardware processor. The CP data model 120 may serve as an input parameter into a hardware and/or software component, such as a CP solver 132.

A CP data model 120 includes a set of data model elements; and domains of possible values that can be assigned to each element. A data model element cannot be assigned a value that is not within the domain of the data model element. A data model element may be implemented as an array, a vector, a linked list, a table, a software variable, a constant, and/or other software data structures or data objects.

In an embodiment, a CP data model 120 includes (a) a set of task elements representing a set of maintenance tasks, and (b) a set of time elements representing a set of time windows. Each domain of a task element represents time windows available for performing the maintenance task corresponding to the task element. Each domain of a time element represents task counts permitted during the time window corresponding to the time element.

As an example, a set of machines to be maintained over a 7-day time period (Sunday to Saturday) may include Canning Machine and Sealing Machine. Server C may be configured to perform maintenance tasks for Canning Machine but not for Sealing Machine. Server S may be configured to perform maintenance tasks for Sealing Machine but not for Canning Machine. Server C may be loaned to a different user on Friday and therefore unavailable for performing maintenance tasks for Canning Machine on Friday. Meanwhile, Server S may be available all 7 days.

A set of task elements may be represented as a vector M[i]. M[0] may represent a maintenance task for Canning Machine. M[1] may represent a maintenance task for Sealing Machine. A domain of M[0] may represent time windows available for servicing Canning Machine, that is, Sunday, Monday, Tuesday, Wednesday, Thursday, and Saturday. A domain of M[1] may represent time windows available for servicing Sealing Machine, that is, Sunday, Monday, Tuesday, Wednesday, Thursday, Friday, and Saturday. Hence, the respective domains of the task elements may be expressed as follows:

M[0]: {0, 1, 2, 3, 4, 6};
M[1]: {0, 1, 2, 3, 4, 5, 6};

wherein the values 0-6 within the domains represent the time windows, Sunday, Monday, Tuesday, Wednesday, Thursday, Friday, and Saturday, respectively.

As another example, a set of time windows may include 8 am-10 am, 10 am-12 pm, and 2 pm-4 pm. Due to limited resources, during 8 am-10 am, a maximum of 4 maintenance tasks may be performed. During 10 am-12 pm, a maximum of 6 maintenance tasks may be performed. During 2 pm-4 pm, a maximum of 5 maintenance tasks may be performed.

A set of time elements may be represented as a vector T[i]. T[0] may represent the time window 8 am-10 am. T[1] may represent the time window 10 am-12 pm. T[2] may represent the time window 2 pm-4 pm. Hence, the respective domains of the time elements may be expressed as follows:

T[0]: {0, 1, 2, 3, 4};
T[1]: {0, 1, 2, 3, 4, 5, 6};
T[2]: {0, 1, 2, 3, 4, 5};

wherein the values 0-6, within the domains, represent task counts during a time window.

A CP data model 120 includes a constraint 122 that defines combinations of values that are allowed to be assigned to a set of data model elements (such as task elements and time elements as described above). In particular, a data model 120 includes a constraint 122 that requires each task element to be assigned a time window from the respective domain, such that each time element is assigned a task count from the respective domain.

One type of constraint 122 is a global cardinality constraint (GCC). A GCC accepts three parameters: (a) a set of data model elements, (b) a set of values that may be assigned to the data model elements, and (c) a set of counting elements for counting a number of times that each value has been assigned.

A set of data model elements input to a GCC needs to be assigned a value from a respective domain.

As an example, a set of data model elements input to a GCC may be the task elements described above:

M[0]: {0, 1, 2, 3, 4, 6};
M[1]: {0, 1, 2, 3, 4, 5, 6}.

Hence, M[0] needs to be assigned value from {0, 1, 2, 3, 4, 6}. M[1] needs to be assigned value from {0, 1, 2, 3, 4, 5, 6}.

A set of values input to a GCC include any value that may be assigned to any of the set of data model elements input to the GCC.

As an example, a set of data model elements input to a GCC may be the task elements described above:

M[0]: {0, 1, 2, 3, 4, 6};
M[1]: {0, 1, 2, 3, 4, 5, 6}.

A set of values input to the GCC may include: {0, 1, 2, 3, 4, 5, 6}.

Hence, the set of values includes any value that may be assigned to any of the data model elements, {0, 1, 2, 3, 4, 5, 6}.

A set of counting elements input to a GCC is a set of counters corresponding to a set of values input to the GCC. Each counter counts a number of times that the corresponding value is assigned to any of a set of data model elements.

As an example, a set of data model elements input to a GCC may be the task elements described above:

M[0]: {0, 1, 2, 3, 4, 6};

M[1]: {0, 1, 2, 3, 4, 5, 6}.

A set of values input to the GCC may include {0, 1, 2, 3, 4, 5, 6} as described above.

A set of counting elements input to the GCC may be:
T[0]: {0, 1, 2};
T[1]: {0, 1};
T[2]: {0, 1, 2, 3};
T[3]: {0, 1, 2, 3, 4, 5};
T[4]: {0, 1, 2, 3, 4};
T[5]: {0, 1, 2};
T[6]: {0}.

Hence, T[0] represents a number of times that the value 0 may be assigned. T[1] represents a number of times that the value 1 may be assigned. T[2] represents a number of times that the value 2 may be assigned. T[3] represents a number of times that the value 3 may be assigned. T[4] represents a number of times that the value 4 may be assigned. T[5] represents a number of times that the value 5 may be assigned. T[6] represents a number of times that the value 6 may be assigned.

Further, a domain of T[0] indicates that the value 0 may be assigned (to any data model element) a maximum of 2 times. A domain of T[1] indicates that the value 1 may be assigned (to any data model element) a maximum of 1 time. A domain of T[2] indicates that the value 2 may be assigned (to any data model element) a maximum of 3 times. A domain of T[3] indicates that the value 3 may be assigned (to any data model element) a maximum of 5 times. A domain of T[4] indicates that the value 4 may be assigned (to any data model element) a maximum of 4 times. A domain of T[5] indicates that the value 5 may be assigned (to any data model element) a maximum of 2 times. A domain of T[6] indicates that the value 6 may be assigned a maximum of 0 times (which means, the value 6 cannot be assigned to any data model element at all).

Based on a GCC, a CP solver 132 determines a CP solution wherein each data model element is assigned a value from the respective domain, such that each counting element is assigned a value from the respective domain. Hence, each data model element is assigned a value from the respective domain, while the number of times that each value is assigned is restricted by the domains of the counting elements.

In one or more embodiments, a CP search directive 124 is a directive that guides a CP solver 132 in the process of determining a CP solution given a particular CP data model 120. A CP search directive guides the assignment a set of values to a set of data model elements that satisfies all constraints, as specified by a CP data model 120. A CP search directive 124 prioritizes the assignment of certain values over other values for one or more elements. Different CP search directives 124 for a same CP data model 120 may result in different CP solutions. A CP search directive 124 may be implemented as a software data structure. The CP search directive 124 may include a set of computer-readable instructions. The CP search directive 124 may serve as an input parameter into a hardware and/or software component, such as a CP solver 132.

In an embodiment, a CP search directive 124 includes applying different time window prioritization methods to maintenance tasks for machines having different failure probabilities. A time window prioritization method specifies which time windows are prioritized or preferred for one or more maintenance tasks for one or more machines. Different time window prioritization methods are applied to each of a high risk group 126, a medium risk group 128, and a low risk group 130. The high risk group 126 includes machines associated with failure probabilities above a high threshold value. The medium risk group 128 includes machines associated with failure probabilities between a low threshold value and a high threshold value. The low risk group 130 includes machines associated with failure probabilities below a low threshold value. Different time windows may be prioritized or preferred for each of the high risk group 126, the medium risk group 128, and the low risk group 130. As an example, earlier time windows may be preferred for the high risk group 126, while later time windows may be preferred for the low risk group 130.

In an embodiment, a CP search directive 124 includes assigning one of the earliest available time windows to maintenance tasks for machines associated with greatest failure probabilities. Additionally or alternatively, the CP search directive 124 includes assigning one of the latest available time windows to maintenance tasks for machines associated with lowest failure probabilities. Additionally or alternatively, the CP search directive 124 includes assigning a time window associated with a lower delinquency cost, rather than a time window associated with a higher delinquency cost, to a maintenance task. Additionally or alternatively, the CP search directive 124 includes assigning a time window closer to a currently-scheduled time window, rather than a time window farther from the currently-scheduled time window, to a maintenance task. A currently-scheduled time window may also be referred to herein as a "current time window."

In one or more embodiments, a data model generator 114 refers to hardware and/or software configured to generate a CP data model 120. Examples of operations for generating a CP data model 120 are described below with reference to FIG. 3.

In one or more embodiments, a search directive generator 116 refers to hardware and/or software configured to generate a CP search directive 124. Examples of operations for generating a CP search directive 124 are described below with reference to FIG. 4.

In one or more embodiments, a data model generator 114 and/or search directive generator 116 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant (PDA).

In one or more embodiments, a CP solver 132 refers to hardware and/or software configured to determine a CP solution, given a CP data model 120 and a CP search directive 124, using constraint programming techniques. Constraint programming techniques include, for example, backtracking algorithms and forward-checking algorithms.

In one or more embodiments, a proposed maintenance schedule 134 is a schedule for performing one or more maintenance tasks 104a-b as determined by a CP solver 132 based on a CP data model 120 and a CP search directive 124. A proposed maintenance schedule 134 may be a revision from one or more current maintenance schedules 110a-b.

In one or more embodiments, maintenance resources 136 refers to hardware and/or software configured to perform one or more operations of maintenance tasks 104a-b for a set of machines 102a-b. Additionally or alternatively, maintenance resources 136 refers to human resources skilled to perform one or more operations of maintenance tasks 104*a-b* for a set of machines 102*a-b*. Different maintenance resources 136 may be required for different maintenance tasks 104*a-b*. As an example, a maintenance task may be an oil change. Maintenance resources for the maintenance task may include an oil changing machine, new oil, and a worker skilled to operate the oil changing machine. As another example, a maintenance task may be a software update. Maintenance resources for the maintenance task may include a server configured to perform the software update. As another example, a maintenance task may be garbage collection for an application. Maintenance resources for the maintenance task may include a garbage collector configured to perform garbage collection on a memory associated with the application.

In some embodiments, maintenance resources 136 includes only machines, computing devices, and/or tools, without any human intervention. Performance of a maintenance task is hence fully automated. In some embodiments, maintenance resources 136 may include workers with particular skills, such as workers capable of operating an oil changing machine, or workers capable of operating a computer server.

In one or more embodiments, a GUI 138 refers to hardware and/or software configured to facilitate communications between (a) a user and (b) a CP solver 132. A GUI 138 may be rendered and/or displayed on a screen and/or monitor. A GUI 138 may present one or more interface elements for presenting information to a user and/or for receiving information from a user. Examples of interface elements include checkboxes, radio buttons, dropdown lists, list boxes, buttons, toggles, text fields, date and time selectors, command lines, sliders, pages, and/or forms. Other types of user interfaces include a command line interface (CLI), a haptic interface, and a voice command interface.

Components of a GUI 138 may be specified in one or more languages, such as Java, C, and/or C++. In some embodiments, the behavior of interface elements is specified in a dynamic programming language, such as JavaScript. The content of interface elements is specified in a markup language, such as hypertext markup language (HTML) or XML User Interface Language (XUL). The layout of interface elements is specified in a style sheet language, such as Cascading Style Sheets (CSS).

In an embodiment, a GUI 138 presents a proposed maintenance schedule 134 overlaid on top of one or more current maintenance schedules 110*a-b*. The proposed maintenance schedule 134 and the current maintenance schedules 110*a-b* may be associated with different visualizations, such as colors, shapes, and/or animations. A GUI 138 presents an interface element configured to receive user input accepting, rejecting, and/or further modifying a proposed maintenance schedule 134.

3. Generating a Constraint Programming Data Model and Search Directive for Obtaining a Proposed Maintenance Schedule One or more operations illustrated in FIGS. 2-8 may be modified, rearranged, and/or omitted all together. Accordingly, the particular sequence of operations illustrated in FIGS. 2-8 should not be construed as limiting the scope of one or more embodiments.

A. Determining a Set of Machines, Maintenance Tasks, and Related Information

Figure 2:
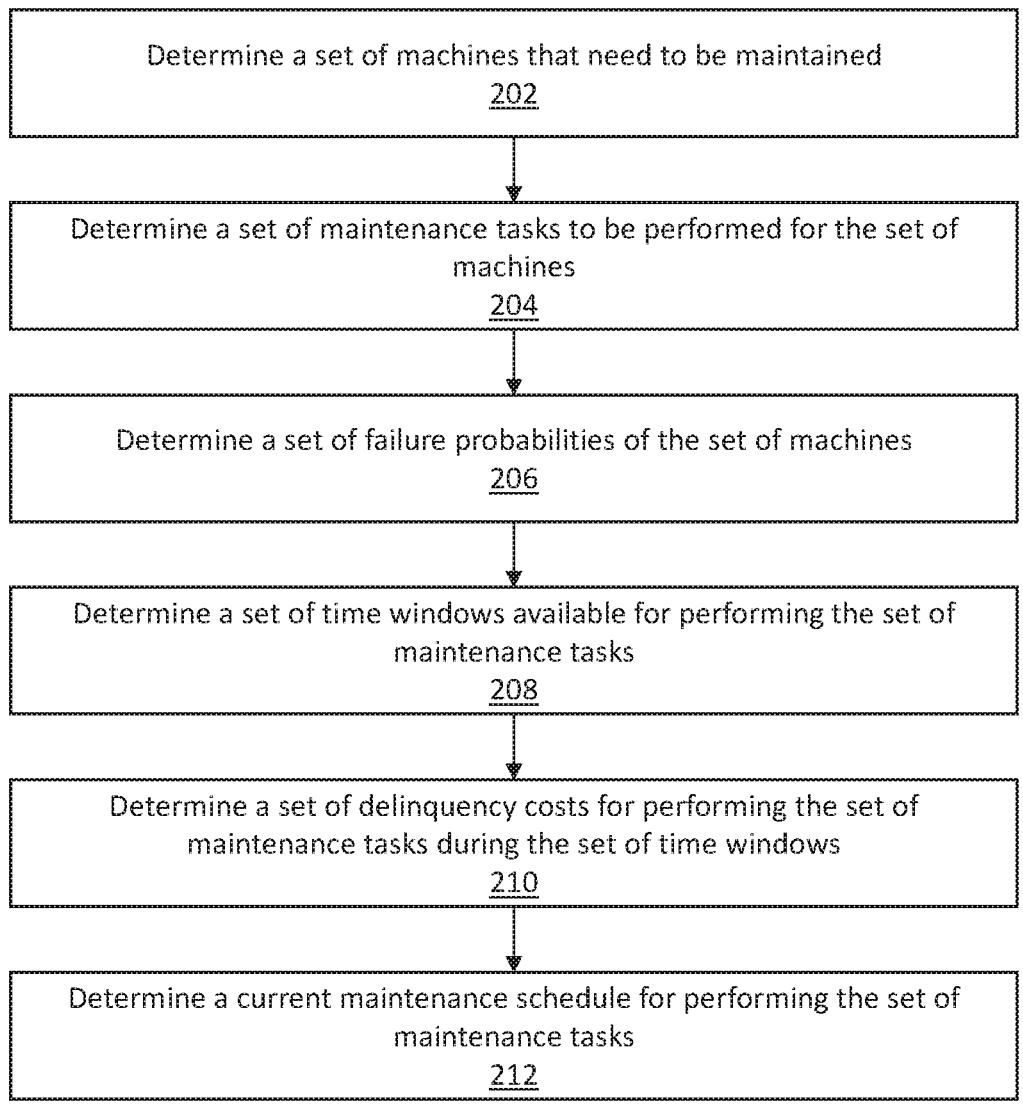
FIG. 2 illustrates an example set of operations for determining a set of machines, maintenance tasks, and other information associated with obtaining a proposed maintenance schedule, in accordance with one or more embodiments.

FIG. 2 illustrates an example set of operations for determining a set of machines, maintenance tasks, and other information associated with obtaining a proposed maintenance schedule, in accordance with one or more embodiments.

One or more embodiments include determining a set of machines that need to be maintained (Operation 202). A data model generator 114 and/or search directive generator 116 obtains identities of a set of machines that need to be maintained from a data repository. As an example, a set of machines that need to be maintained may be factory machines in a factory. A data model generator may obtain identities of the factory machines from a machine database. As another example, a set of machines that need to be maintained may be trucks of a delivery company. A data model generator may obtain identities of the trucks from a truck database. As another example, a set of machines that need to be maintained may be cloud servers in a cloud network. A data model generator may obtain identities of the cloud servers from a master server.

One or more embodiments include determining a set of maintenance tasks to be performed for the set of machines (Operation 204). The data model generator 114 and/or search directive generator 116 obtains a set of maintenance tasks to be performed for the set of machines from a data repository. The data model generator 114 and/or search directive generator 116 may obtain identities of one or more maintenance tasks (such as, a task identifier (ID) corresponding to each maintenance task). Additionally or alternatively, the data model generator 114 and/or search directive generator 116 may obtain instructions, which when executed by at least one device including a hardware processor, performs one or more maintenance tasks.

One or more maintenance tasks may be performed on a particular machine. As an example, a set of machines to be maintained may include Garment Machine and Ironing Machine. Garment Machine may require two maintenance tasks: replacing gears, and cleaning crevices. Ironing Machine may require one maintenance task: replacing metal plates.

One or more embodiments include determining a set of failure probabilities of the set of machines (Operation 206). The data model generator 114 and/or search directive generator 116 obtains a set of failure probabilities of the set of machines from a data repository. The set of failure probabilities may be specified by a user. Additionally or alternatively, the set of failure probabilities may be determined by an application. The set of failure probabilities may be determined based on various factors, such as data detected by one or more sensors associated with one or more machines, usage frequencies of the machines, usage durations of the machines, and/or types of usage of the machines.

As an example, a set of machines may include factory machines. A sensor associated with a particular factory machine may detect an internal temperature of the particular factory machine. A failure probability of the particular factory machine may be determined based on the internal temperature. As another example, a set of machine may include a fleet of trucks. A sensor associated with a particular truck may detect a number of miles traveled by the truck. A failure probability of the particular truck may be determined based on the mileage on the truck.

One or more embodiments include determining a set of time windows available for performing the set of maintenance tasks (Operation 208). The data model generator 114 and/or search directive generator 116 obtains a set of time windows available for performing the set of maintenance tasks from a data repository. The set of time windows may be specified by a user. Additionally or alternatively, the set of time windows may be determined by an application. The set of time windows available for performing the set of maintenance tasks may be determined based on availability of maintenance resources. Time windows available for performing each maintenance task may be the same or different. The duration of each time window may be the same or different.

As an example, a data model generator may determine that time windows available for performing a software update maintenance task are: Monday, Tuesday, and Wednesday. The data model generator may further determine that time windows available for performing a garbage collection maintenance task are: Thursday, and Friday. As another example, a data model generator may determine that time windows available for an oil change task are: 10 am-11 am, and 12 pm-1 pm, on a daily basis. The data model generator may further determine that time windows available for a tire rotation task are: 12 pm-2 pm, and 3 pm-4 pm, on a daily basis.

One or more embodiments include determining a set of delinquency costs for performing the set of maintenance tasks during the set of time windows (Operation 210). The data model generator 114 and/or search directive generator 116 obtains a set of delinquency costs for performing the set of maintenance tasks during the set of time windows from a data repository. The set of delinquency costs may be specified by a user. Additionally or alternatively, the set of delinquency costs may be determined by an application. Delinquency costs for performing a particular maintenance task on a particular machine during a particular time window may be determined based on a value of products that are scheduled for production by the particular machine during the particular time window. Delinquency costs for a particular maintenance task during each time window may be the same or different. Delinquency costs for each maintenance task during a particular time window may be the same or different.

As an example, a set of maintenance tasks include: Task A, Task B, and Task C. Time windows available for performing Task A are: Monday and Wednesday. Time windows available for performing Task B are: Monday, Wednesday, and Friday. Time windows available for performing Task C are: Tuesday and Thursday. A data model generator may determine that a set of delinquency costs for Task A, Task B, and Task C during the time windows Monday through Friday are as follows:

|        | Monday | Tuesday | Wednesday | Thursday | Friday |
|--------|--------|---------|-----------|----------|--------|
| Task A | 98     | N/A     | 30        | N/A      | N/A    |
| Task B | 45     | N/A     | 65        | N/A      | 70     |
| Task C | N/A    | 53      | N/A       | 88       | N/A    |

One or more embodiments include determining a current maintenance schedule for performing the set of maintenance tasks (Operation 212). The data model generator 114 and/or search directive generator 116 obtains a current maintenance schedule for performing the set of maintenance tasks from a data repository. The current maintenance schedule may be specified by a user. Additionally or alternatively, the current maintenance schedule may be determined by an application. The current maintenance schedule may be determined based on various factors, such as a recommended service interval, and a maintenance schedule previously determined by a CP solver.

B. Determining a Constraint Programming Data Model

Figure 3:
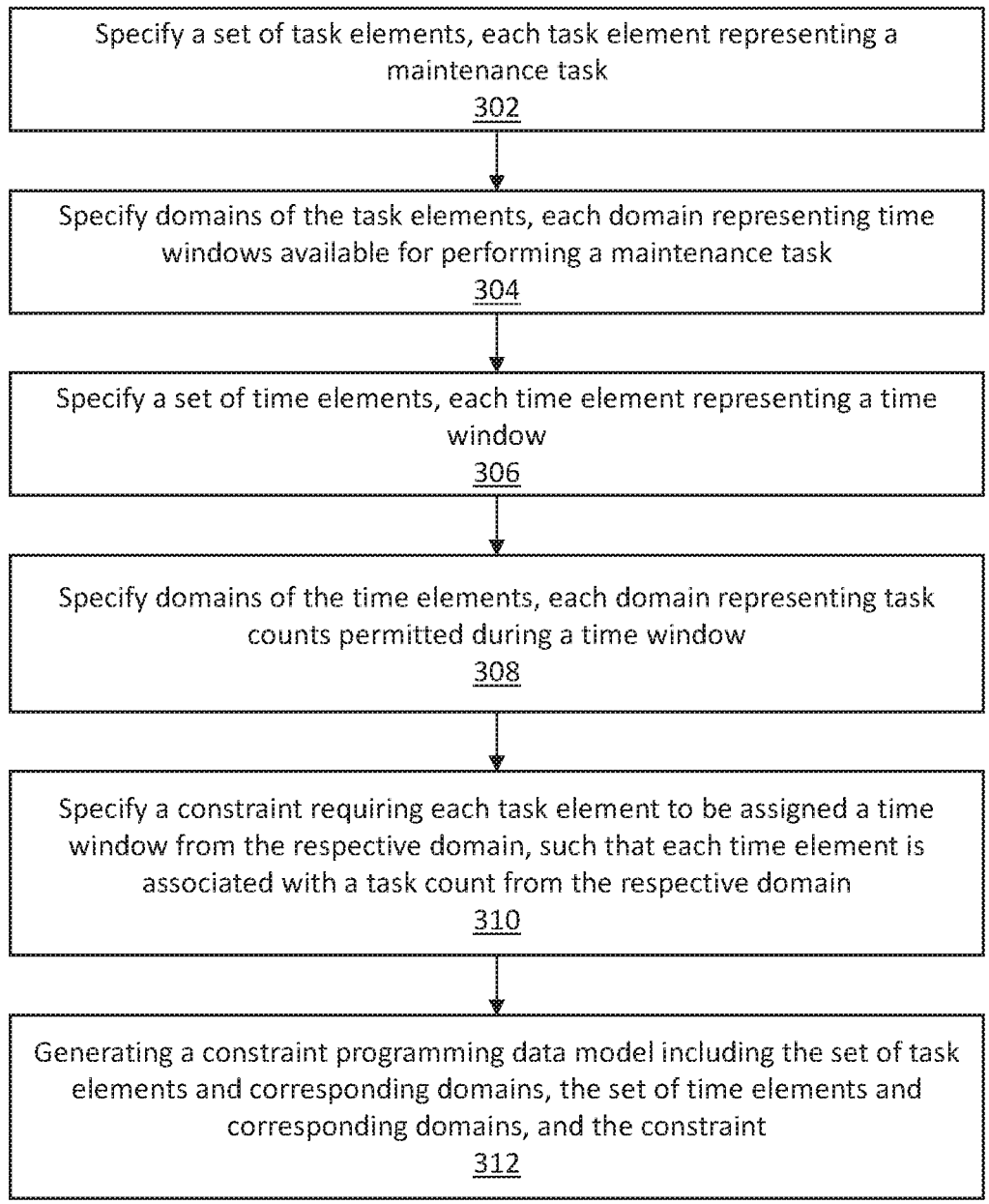
FIG. 3 illustrates an example set of operations for generating a constraint programming data model, in accordance with one or more embodiments.

FIG. 3 illustrates an example set of operations for generating a constraint programming data model, in accordance with one or more embodiments.

One or more embodiments include specifying a set of task elements, each task element representing a maintenance task (Operation 302). A data model generator 114 specifies a set of task elements. The set of task elements may be represented by a vector, an array, and/or any other data structure. Each task element represents one of the set of maintenance tasks determined at Operation 204 of FIG. 2.

One or more embodiments include specifying domains of the task elements, each domain representing time windows available for performing a maintenance task (Operation 304). The data model generator 114 specifies domains of the task elements. Each domain may be represented by a vector, an array, and/or any other data structure. A domain for a particular task element represents the set of time windows available for performing a maintenance task represented by the particular task element.

As an example, a set of maintenance tasks may include Task A and Task B. Time windows Monday and Tuesday may be available for performing Task A. Time windows Wednesday and Thursday may be available for performing Task B.

A data model generator may specify a set of task elements, representing the maintenance tasks, expressed as vector M[i]. M[0] may represent Task A. M[1] may represent Task B. The domains of the task elements may be as follows:

M[0]: {1, 2}
M[1]: {3, 4} wherein the values 0-6 within the domains represent time windows, Sunday, Monday, Tuesday, Wednesday, Thursday, Friday, and Saturday, respectively.

One or more embodiments include specifying a set of time elements, each time element representing a time window (Operation 306). The data model generator 114 specifies a set of time elements. The set of time elements may be represented by a vector, an array, and/or any other data structure. Each time element represents one of the set of time windows determined at Operation 208 of FIG. 2.

One or more embodiments include specifying domains of the time elements, each domain representing task counts permitted during a time window (Operation 308). The data model generator 114 specifies domains of the time elements. Each domain may be represented by a vector, an array, and/or any other data structure. A domain for a particular time element represents the task counts permitted during a time window represented by the particular time element.

As an example, a set of time windows may include 9 am-11 am, 12 pm-2 pm, and 3 pm-5 pm. A maximum number of maintenance tasks that may be performed during 9 am-11 am may be 3. Hence, tasks counts permitted during 9 am-11 am are: 0, 1, 2, 3. A maximum number of maintenance tasks that may be performed during 12 pm-2 pm may be 2. Hence, tasks counts permitted during 12 pm-2 pm are: 0, 1, 2. A maximum number of maintenance tasks that may be performed during 3 pm-5 pm may be 4. Hence, tasks counts permitted during 3 pm-5 pm are: 0, 1, 2, 3, 4.

A data model generator may specify a set of time elements, representing the time windows, expressed as vector T[i]. T[0] may represent 9 am-11 am. T[1] may represent 12 pm-2 pm. T[2] may represent 3 pm-5 pm. The domains of the time elements may be as follows:

T[0]: {0, 1, 2, 3}
T[1]: {0, 1, 2}
T[2]: {0, 1, 2, 3, 4}

One or more embodiments include specifying a constraint requiring each task element to be assigned a time window from the respective domain, such that each time element is associated with a task count from the respective domain (Operation 310). The data model generator 114 specifies a constraint requiring each task element to be assigned a time window from the respective domain, such that each time element is associated with a task count from the respective domain. The constraint requires that a particular task element be assigned a time window from a domain of the particular task element. The constraint requires that a particular time element is associated with a task count from a domain of the particular time element.

In an embodiment, the data model generator 114 specify the contrast using a GCC with the inputs: (a) the set of task elements, (b) values that may be assigned to any of the set of task elements, and (c) the set of time elements. Based on the GCC, each task elements is assigned a value from a domain of the task element. Further, the set of time elements serve as counting elements that count a number of times each time window is assigned. Each time element may only assume a value from a domain of the time element.

One or more embodiments include generating a CP data model including the set of task elements and corresponding domains, the set of time elements and corresponding domains, and the constraint (Operation 312). The data model generator 114 generates a CP data model including the set of task elements and corresponding domains, the set of time elements and corresponding domains, and the constraint. The CP data model may be stored as a software data structure. The CP data model may include one or more arrays, vectors, linked lists, tables, software variables, constants, and/or data objects. The CP data model may include a set of instructions executable by one or more devices including a hardware processor.

C. Determining a Constraint Programming Search Directive

Figure 4:
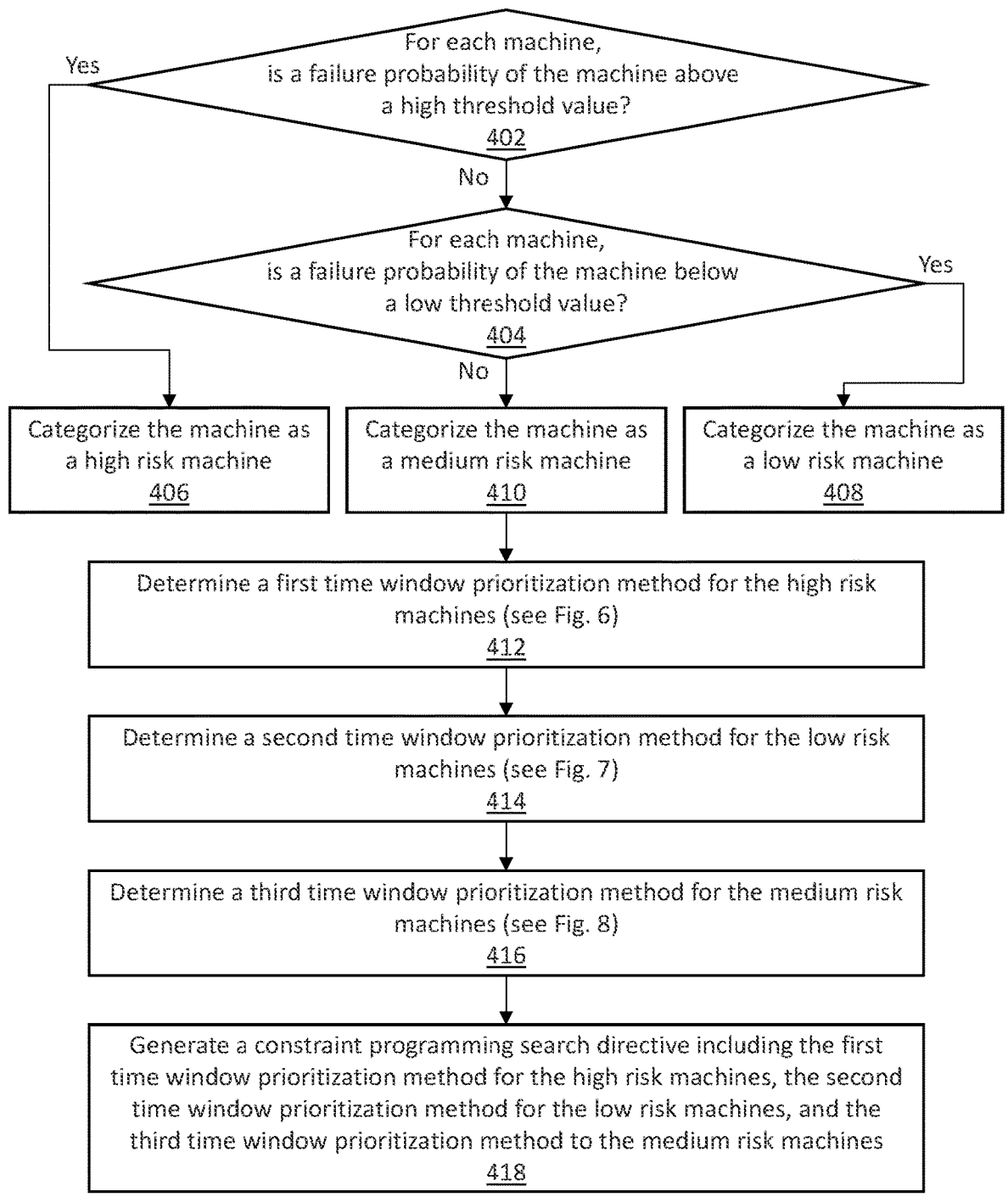
FIG. 4 illustrates an example set of operations for generating a constraint programming search directive, in accordance with one or more embodiments.

FIG. 4 illustrates an example set of operations for generating a constraint programming search directive, in accordance with one or more embodiments. As illustrated in FIG. 4, operations for categorizing machines into three categories—High Risk, Medium Risk, and Low Risk—are described. However, any number of categories may be used. Further, any criteria for defining the categories may be used. A different time window prioritization method is used for each category.

One or more embodiments include determining whether a failure probability of each machine is above a high threshold value (Operation 402). A search directive generator 116 obtains a failure probability of each machine, as described above at Operation 206. The search directive generator 116 compares the failure probability of each machine to a high threshold value. The high threshold value may be a fixed value or a configurable value. The high threshold value may be stored in a data repository, specified by a user, and/or determined by an application.

One or more embodiments include determining whether a failure probability of each machine is below a low threshold value (Operation 404). The search directive generator 116 obtains a failure probability of each machine, as described above at Operation 206. The search directive generator 116 compares the failure probability of each machine to a low threshold value. The low threshold value may be a fixed value or a configurable value. The low threshold value may be stored in a data repository, specified by a user, and/or determined by an application.

As an example, a user may specify that an objective to be satisfied in generating a proposed maintenance schedule is to apply different time window prioritization methods to: (a) maintenance tasks for machines with failure probabilities above 90%, (b) maintenance tasks for machines with failure probabilities between 10% and 90%, and (c) maintenance tasks for machines with failure probabilities below 10%. Based on user input specifying the objective, a search directive generator may determine that a high threshold value is 90. The search directive may determine that a low threshold value is 10.

If the failure probability of a machine is above the high threshold value, the machine is categorized as a high risk machine (Operation 406). If the failure probability of a machine is below the low threshold value, the machine is categorized as a low risk machine (Operation 408). If the failure probability of a machine is between the low threshold value and the high threshold value, the machine is categorized as a medium risk machine (Operation 410). Additional categories of machines may optionally be used. As an example, a set of machines may be categorized into four categories based on a set of failure probabilities: critical risk, high risk, medium risk, and low risk. As another example, categorization may depend upon a failure probability combined with a brand name. A set of machines include machines of Brand A and machines of Brand B. The set of machines may be categorized as follows: high risk and Brand A, low risk and Brand A, high risk and Brand B, and low risk and Brand B.

One or more embodiments include determining a first time window prioritization method for the high risk machines (Operation 412). The search directive generator 116 determines a first time window prioritization method for the high risk machines.

In an embodiment, the search directive generator 116 obtains the first time window prioritization method for the high risk machines from a data repository. The search directive generator 116 obtains a set of instructions corresponding to the first time window prioritization method. The set of instructions prioritizes assignment of certain time windows over other time values for the high risk machines.

In an embodiment, the search directive generator 116 obtains one or more objectives from a user and/or an application. Based on the objectives, the search directive generator 116 determines the first time window prioritization method for the high risk machines. The search directive generator 116 generates a set of instructions corresponding to the first time window prioritization method. As an example, a search directive generator determines a time window prioritization method by referring to a set of mappings stored in a data repository. The set of mappings may map objectives to time window prioritization methods. An objective of lowering delinquency costs may map to a time window prioritization method that prioritizes time windows associated with lower delinquency costs. An objective of minimizing disturbance to a current maintenance schedule may map to a time window prioritization method that prioritizes time windows closer to current time windows. The set of mappings may be specified by a user and/or determined by an application. As another example, a search directive generator may apply a set of rules, a machine algorithm, and/or other methods to one or more objectives to determine a time window prioritization method.

In an embodiment, the search directive generator 116 optionally obtains parameters that customize the first time window prioritization method for the high risk machines. As an example, a time window prioritization method may include selecting one of the earliest n time windows to assign to a high risk machine. The parameter n may be configurable by a user and/or an application. As another example, a time window prioritization method may include selecting a time window associated with a delinquency cost below a threshold value d. The parameter d may be configurable by a user and/or an application.

A specific example of a first time window prioritization method for the high risk machines is described below with reference to FIG. 6.

One or more embodiments include determining a second time window prioritization method for the low risk machines (Operation 414). The search directive generator 116 determines a second time window prioritization method for the low risk machines. Examples of operations for determining a time window prioritization method are described above with reference to Operation 412.

A specific example of a second time window prioritization method for the low risk machines is described below with reference to FIG. 7.

One or more embodiments include determining a third time window prioritization method for the medium risk machines (Operation 416). The search directive generator 116 determines a third time window prioritization method for the medium risk machines. Examples of operations for determining a time window prioritization method are described above with reference to Operation 412.

A specific example of a third time window prioritization method for the medium risk machines is described below with reference to FIG. 8.

In one or more embodiments, a different time window prioritization method is used for each category of machines, regardless of the number of categories of machines. Additional and/or alternative time window prioritization methods may be used.

One or more embodiments include generating a CP search directive including the first time window prioritization method for the high risk machines, the second time window prioritization method for the low risk machines, and the third time window prioritization method for the medium risk machines (Operation 418). The search directive generator 116 generates a CP search directive including the first time window prioritization method for the high risk machines, the second time window prioritization method for the low risk machines, and the third time window prioritization method for the medium risk machines. The CP search directive may be stored as a software data structure. The CP search directive may include one or more arrays, vectors, linked lists, tables, software variables, constants, and/or data objects. The CP search directive may include a set of instructions executable by one or more devices including a hardware processor.

Figure 6:
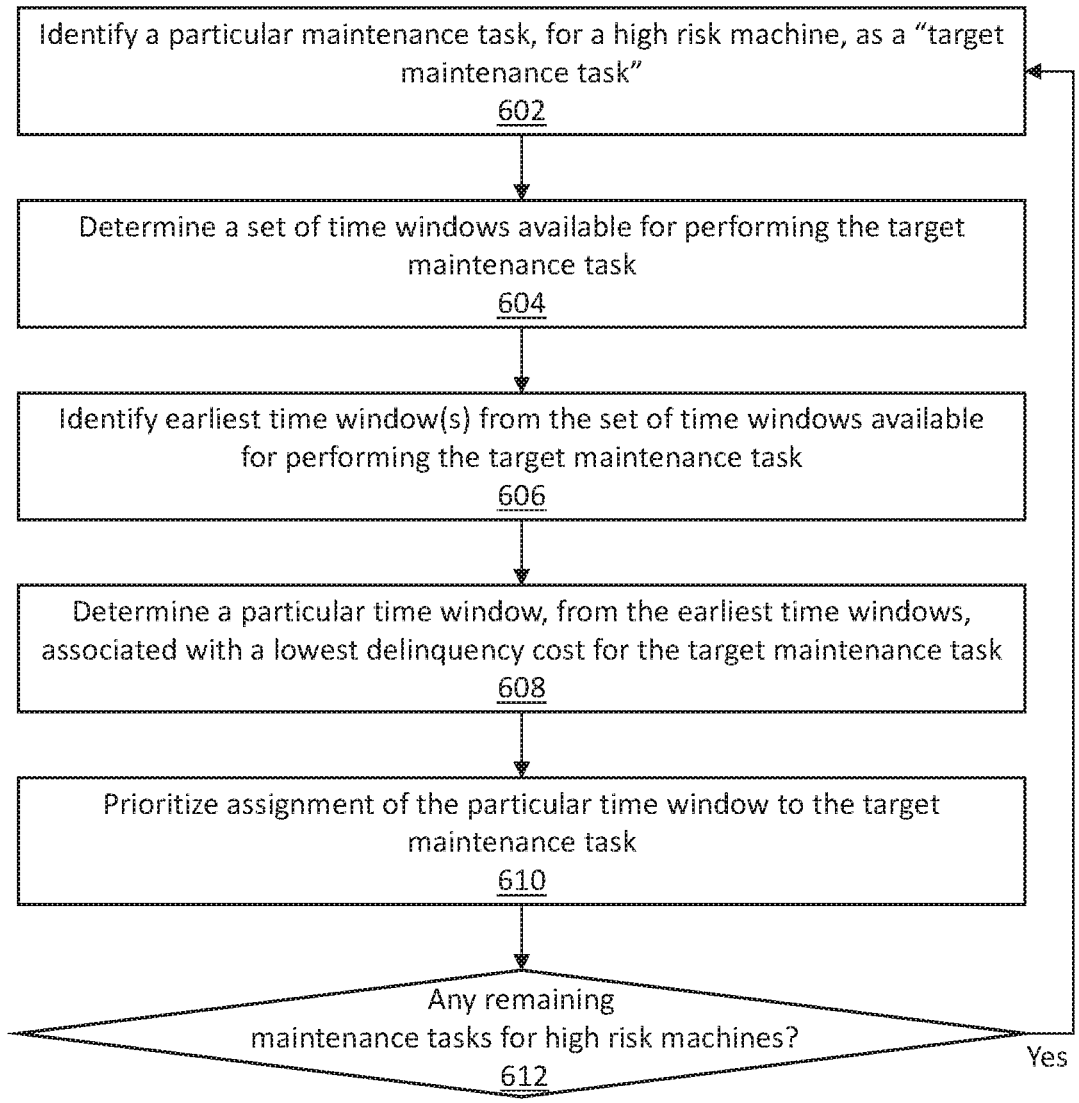
FIG. 6 illustrates an example set of operations included in a time window prioritization method for a set of high risk machines, in accordance with one or more embodiments.
Figure 7:
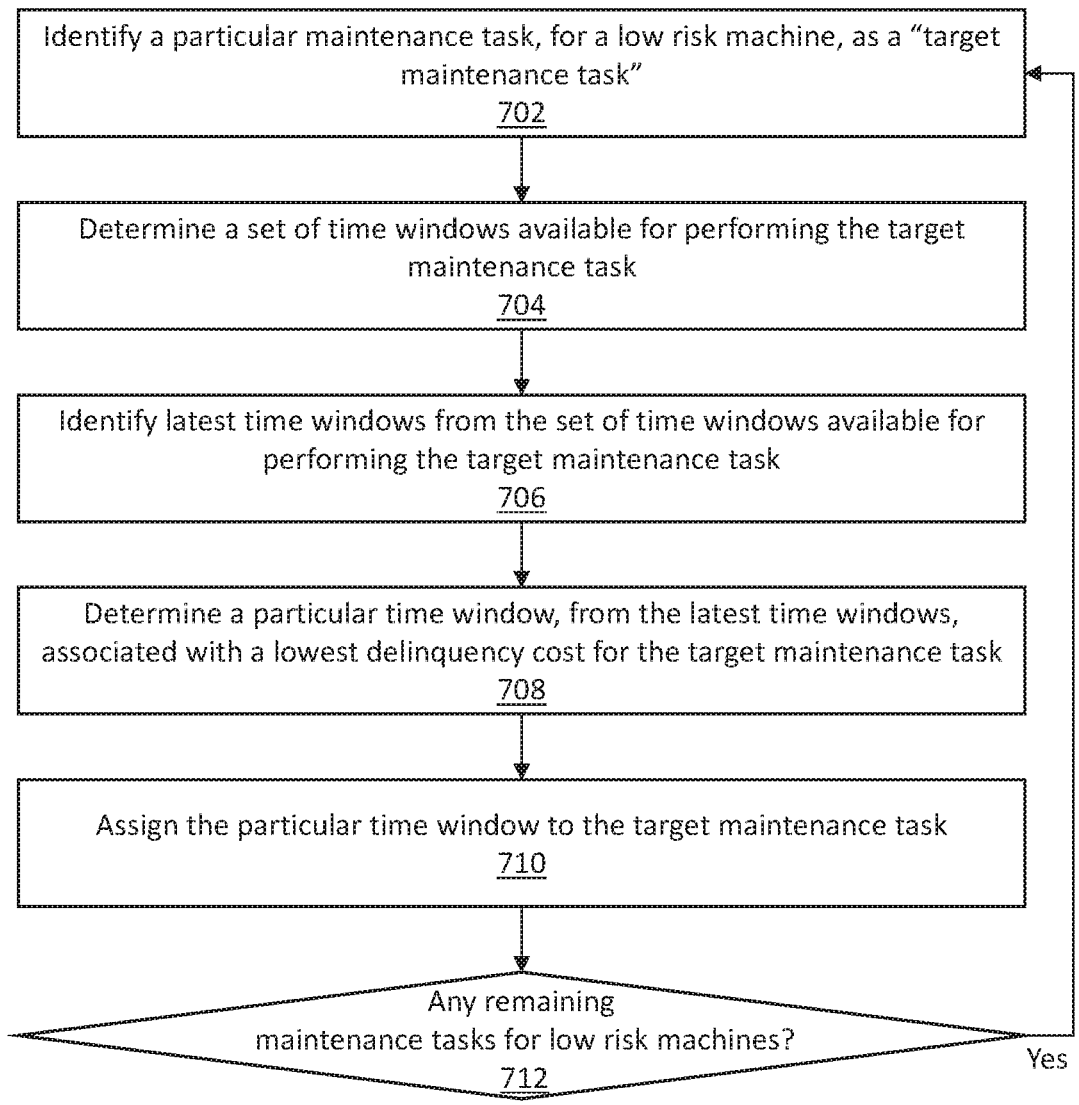
FIG. 7 illustrates an example set of operations included in a time window prioritization method for a set of low risk machines, in accordance with one or more embodiments.
Figure 8:
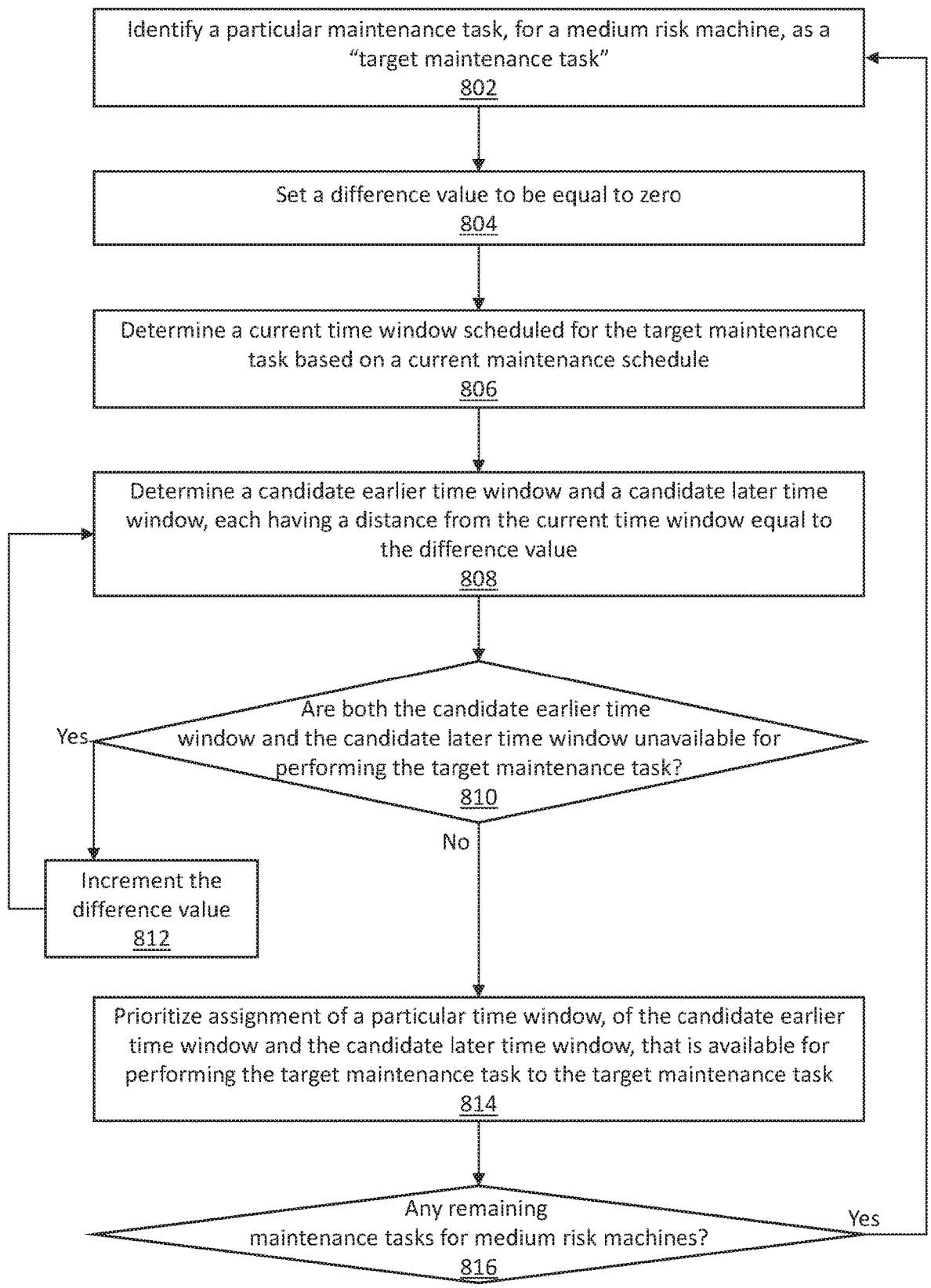
FIG. 8 illustrates an example set of operations included in a time window prioritization method for a set of medium risk machines, in accordance with one or more embodiments.

Referring to FIGS. 6-8, FIGS. 6-8 describe examples of time window prioritization methods that may be applied to Operations 412-416 of FIG. 4. In some embodiments, additional and/or alternative time window prioritization methods may be used other than the time window prioritization methods described below with reference to FIGS. 6-8.

FIG. 6 illustrates an example set of operations included in a time window prioritization method for a set of high risk machines, in accordance with one or more embodiments. A search directive generator 116 may determine, specify, and/ or obtain the example set of operations described herein. The example set of operations described herein may be expressed in any computing language, such as Java, C, C++, and/or Ruby. The example set of operations may be but are not necessarily expressed using CP constructs and/or CP commands.

One or more embodiments include identifying a particular maintenance task, for a high risk machine, as a "target maintenance task." (Operation 602). A search directive generator 116 determines, specifies, and/or obtains instructions for traversing each maintenance task in a subset of maintenance tasks for the high risk machines. A particular maintenance task is selected as a starting point.

One or more embodiments include determining a set of time windows available for performing the target maintenance task (Operation 604). The search directive generator 116 determines, specifies, and/or obtains instructions for determining a set of time windows available for performing the target maintenance task. The set of time windows available for performing the target maintenance task depends on (a) a domain of the target maintenance task, and/or (b) current task counts for the set of time windows.

In an embodiment, a domain of a maintenance task is updated based on task counts for the set of time windows. When a task count for a particular time window has reached the respective maximum value, the particular time window is removed from domains of the maintenance tasks. Hence, the time windows available for performing the target maintenance task are the time windows currently remaining in the domain of the target maintenance task.

In an embodiment, a domain of a maintenance task is not updated based on task counts for the set of time windows. Hence, the time windows that are available for performing the target maintenance task are the time windows in the domain of the target maintenance task minus the time windows for which the respective task count has reached the respective maximum values.

One or more embodiments include identifying one or more earliest time windows from the set of time windows available for performing the target maintenance task (Operation 606). The search directive generator 116 determines, specifies, and/or obtains instructions for identifying n earliest time windows from the set of time windows available for performing the target maintenance task. The parameter n may be fixed, or configurable by a user and/or an application.

As an example, a search directive generator may determine instructions that use a CP construct to limit the time windows that are assignable to the target maintenance task. The CP construct may be an in operation, which is used in constraint programming. As another example, a search directive generator may determine instructions, which do not use CP constructs, for limiting the time windows that are assignable to the target maintenance task.

One or more embodiments include determining a particular time window, from the earliest time windows, associated with a lowest delinquency cost for the target maintenance task (Operation 608). The search directive generator 116 determines, specifies, and/or obtains instructions for determining a particular time window, from the earliest time windows, associated with a lowest delinquency cost for the target maintenance task.

As an example, a search directive generator may determine instructions that use a CP construct to sort time windows based on associated delinquency costs, and thereby prioritize a time window with the lowest delinquency cost. A CP construct may be used to limit search to a set of preferred values. Hence, a CP construct may guide the CP solver 132 to perform a preference-based search. In particular, a CP construct may set the preferences based on the delinquency costs associated with the time windows for the target maintenance task. A CP construct may cause time windows to be sorted based on the delinquency costs. As another example, a search directive generator may determine instructions, which do not use CP constructs, for determining a time window associated with the lowest delinquency cost, and prioritizing the time window associated with the lowest delinquency cost.

One or more embodiments include prioritizing assignment of the particular time window to the target maintenance task (Operation 610). The search directive generator 116 determines, specifies, and/or obtains instructions for prioritizing assignment of the particular time window to the target maintenance task. Prioritizing assignment of the particular time window to the target maintenance task may include attempting to assign the particular time window to the target maintenance task before attempting other time windows. The particular time window is hence preliminarily assigned to the target maintenance task. As further described below with reference to FIG. 5, a CP solver 132 may backtrack on preliminary assignments as necessary. Alternatively, the CP solver 132 may finalize preliminary assignments upon finding a CP solution that satisfies all constraints.

One or more embodiments include determining whether there are any remaining maintenance tasks for high risk machines (Operation 612). The search directive generator 116 determines, specifies, and/or obtains instructions for determining whether there are any remaining maintenance tasks for high risk machines. As described above, each maintenance task in the subset of maintenance tasks for the high risk machines is traversed.

FIG. 7 illustrates an example set of operations included in a time window prioritization method for a set of low risk machines, in accordance with one or more embodiments. A search directive generator 116 may determine, specify, and/or obtain the example set of operations described herein.

One or more embodiments include identifying a particular maintenance task, for a low risk machine, as a "target maintenance task." (Operation 702). A search directive generator 116 determines, specifies, and/or obtains instructions for traversing each maintenance task in a subset of maintenance tasks for the low risk machines. A particular maintenance task is selected as a starting point.

One or more embodiments include determining a set of time windows available for performing the target maintenance task (Operation 704). Examples for determining a set of time windows available for performing the target maintenance task are described above with reference to Operation 604 of FIG. 6.

One or more embodiments include identifying one or more latest time windows from the set of time windows available for performing the target maintenance task (Operation 706). The search directive generator 116 determines, specifies, and/or obtains instructions for identifying m latest time windows from the set of time windows available for performing the target maintenance task. The parameter m may be fixed, or configurable by a user and/or an application.

As an example, a search directive generator may determine instructions that use a CP construct to limit the time windows that are assignable to the target maintenance task. The CP construct may be an in operation, which is used in constraint programming. As another example, a search directive generator may determine instructions, which do not use CP constructs, for limiting the time windows that are assignable to the target maintenance task.

One or more embodiments include determining a particular time window, from the latest time windows, associated with a lowest delinquency cost for the target maintenance task (Operation 708). The search directive generator 116 determines, specifies, and/or obtains instructions for determining a particular time window, from the latest time windows, associated with a lowest delinquency cost for the target maintenance task.

As an example, a search directive generator may determine instructions that use a CP construct to sort time windows based on associated delinquency costs, and thereby prioritize a time window with the lowest delinquency cost. A CP construct may be used to limit search to a set of preferred values. Hence, a CP construct may guide the CP solver 132 to perform a preference-based search. In particular, a CP construct may set the preferences based on the delinquency costs associated with the time windows for the target maintenance task. A CP construct may cause time windows to be sorted based on the delinquency costs. As another example, a search directive generator may determine instructions, which do not use CP constructs, for determining a time window associated with the lowest delinquency cost, and prioritizing the time window associated with the lowest delinquency cost.

One or more embodiments include prioritizing assignment of the particular time window to the target maintenance task (Operation 710). Examples for prioritizing assignment of the particular time window to the target maintenance task are described above with reference to Operation 610 of FIG. 6.

One or more embodiments include determining whether there are any remaining maintenance tasks for low risk machines (Operation 712). The search directive generator 116 determines, specifies, and/or obtains instructions for determining whether there are any remaining maintenance tasks for low risk machines. As described above, each maintenance task in the subset of maintenance tasks for the low risk machines is traversed.

FIG. 8 illustrates an example set of operations included in a time window prioritization method for a set of medium risk machines, in accordance with one or more embodiments. A search directive generator 116 may determine, specify, and/or obtain the example set of operations described herein.

One or more embodiments include identifying a particular maintenance task, for a medium risk machine, as a "target maintenance task." (Operation 802). A search directive generator 116 determines, specifies, and/or obtains instructions for traversing each maintenance task in a subset of maintenance tasks for the medium risk machines. A particular maintenance task is selected as a starting point.

One or more embodiments include setting a difference value to be equal to zero (Operation 804). The search directive generator 116 determines, specifies, and/or obtains instructions for setting a difference value to be equal to zero. The difference value is used for keeping track of a distance from a current time window scheduled for the target maintenance task.

One or more embodiments include determining a current time window scheduled for the target maintenance task based on a current maintenance schedule (Operation 806). The search directive generator 116 determines, specifies, and/or obtains instructions for determining a current time window scheduled for the target maintenance task based on a current maintenance schedule.

One or more embodiments include determining a candidate earlier time window and a candidate later time window, each having a distance from the current time window equal to the difference value (Operation 808). The search directive generator 116 determines, specifies, and/or obtains instructions for determining a candidate earlier time window and a candidate later time window. The candidate earlier time window is e number of time windows before the current time window, wherein e equals the difference value. The candidate later time window is l number of time windows after the current time window, wherein l equals the difference value.

Initially, the difference value may be set to zero. In this case, both the candidate earlier time window and the candidate later time window are equal to the current time window.

As an example, a set of time windows may include Monday, Tuesday, Wednesday, Thursday, and Friday. A current time window scheduled for a maintenance task may be Wednesday. Initially, a difference value may be 0. Then a candidate earlier time window is 0 time windows before the current time window. Hence, the candidate earlier time window is Wednesday. Similarly, a candidate later time window is 0 time windows after the current time window. Hence, the candidate later time window is also Wednesday. Subsequently, the difference value may be incremented to 1. Then a candidate earlier time window is 1 time window before the current time window. Hence, the candidate earlier time window is Tuesday. Similarly, a candidate later time window is 1 time window after the current time window. Hence, the candidate later time window is Thursday.

One or more embodiments include determining whether both the candidate earlier time window and the candidate later time window are unavailable for performing the target maintenance task (Operation 810). The search directive generator 116 determines, specifies, and/or obtains instructions for determining whether both the candidate earlier time window and the candidate later time window are unavailable for performing the target maintenance task. Whether a time window is available for performing the target maintenance task depends on (a) a domain of the target maintenance task, and/or (b) current task counts for the set of time windows.

In an embodiment, a domain of a maintenance task is updated based on task counts for the set of time windows. When a task count for a particular time window has reached the respective maximum value, the particular time window is removed from domains of the maintenance tasks. Hence, a time window is available for performing the target maintenance task if the time window currently remains in the domain of the target maintenance task.

In an embodiment, a domain of a maintenance task is not updated based on task counts for the set of time windows. Hence, a time window is available for performing the target maintenance task if (a) the time window is in the domain of the target maintenance task and (b) a task count for the time window has not yet reached a maximum value.

One or more embodiments include incrementing the difference value (Operation 812). The search directive generator 116 determines, specifies, and/or obtains instructions for incrementing the difference value, if both the candidate earlier time window and the candidate later time window are unavailable for performing the target maintenance task.

As an example, a search directive generator may determine instructions that use a CP construct to determine and/or prioritize a time window that is closest to the current time window for the target maintenance task. A CP construct may be used to limit search to a value nearest to a preferred target value. Hence, a CP construct may guide the CP solver 132 to perform a preference-based search. In particular, a CP construct may set the preferences based on the current time window of the target maintenance task. A CP construct may cause time windows to be sorted based on distances between each time window and the current time window. As another example, a search directive generator may determine instructions, which do not use CP constructs, for determining and/or prioritizing a time window that is closest to the current time window for the target maintenance task. The instructions may include a difference variable for keeping track of the difference between the candidate time windows and the current time window. The instructions may include initializing the difference variable to zero; determining whether at least one of a candidate earlier time window and a candidate later time window, both of which have a distance from the current time window equal to the current value of the difference variable, is available; and a loop that increments the difference variable if neither the candidate earlier time window nor the candidate later time window is available.

One or more embodiments include prioritizing assignment of a particular time window, of the candidate earlier time window and the candidate later time window, that is available for performing the target maintenance task to the target maintenance task (Operation 814). The search directive generator 116 determines, specifies, and/or obtains instructions for prioritizing assignment of a particular time window, of the candidate earlier time window and the candidate later time window, available for performing the target maintenance task to the target maintenance task, if at least one of the candidate earlier time window and the candidate later time window is available for performing the target maintenance task. If the candidate earlier time window is available for performing the target maintenance task, and the candidate later time window is not available for performing the target maintenance task, then the candidate earlier time window is prioritized. If the candidate earlier time window is not available for performing the target maintenance task, and the candidate later time window is available for performing the target maintenance task, then the candidate later time window is prioritized. If both the candidate earlier time window and the candidate later time window are available for performing the target maintenance task, then any of the candidate earlier time window or the candidate later time window is prioritized. Whether to prioritize the candidate earlier time window or the candidate later time window may be determined randomly. Additionally or alternatively, whether to prioritize the candidate earlier time window or the candidate later time window may be determined based on a rule and/or a function. As an example, a user may desire to prioritize the candidate earlier time window whenever possible. Hence, if both the candidate earlier time window and the candidate later time window are available for performing the target maintenance task, then the candidate earlier time window is prioritized.

Prioritizing assignment of the particular time window to the target maintenance task may include attempting to assign the particular time window to the target maintenance task before attempting other time windows. The particular time window is hence preliminarily assigned to the target maintenance task. As further described below with reference to FIG. 5, a CP solver 132 may backtrack on preliminary assignments as necessary. Alternatively, the CP solver 132 may finalize preliminary assignments upon finding a CP solution that satisfies all constraints.

As an example, a current time window for a target maintenance task may be 12 pm-1 pm. A candidate earlier time window may be 11 am-12 pm. A candidate later time window may be 1 pm-2 pm. The candidate earlier time window may be available for performing the target maintenance task. The candidate later time window is not available for performing the target maintenance task. A search directive generator may determine instructions which prioritize assignment of the candidate earlier time window, over other time windows that have not yet been attempted for the target maintenance task, to the target maintenance task.

One or more embodiments include determining whether there are any remaining maintenance tasks for medium risk machines (Operation 816). The search directive generator 116 determines, specifies, and/or obtains instructions for determining whether there are any remaining maintenance tasks for medium risk machines. As described above, each maintenance task in the subset of maintenance tasks for the medium risk machines is traversed.

Figure 5:
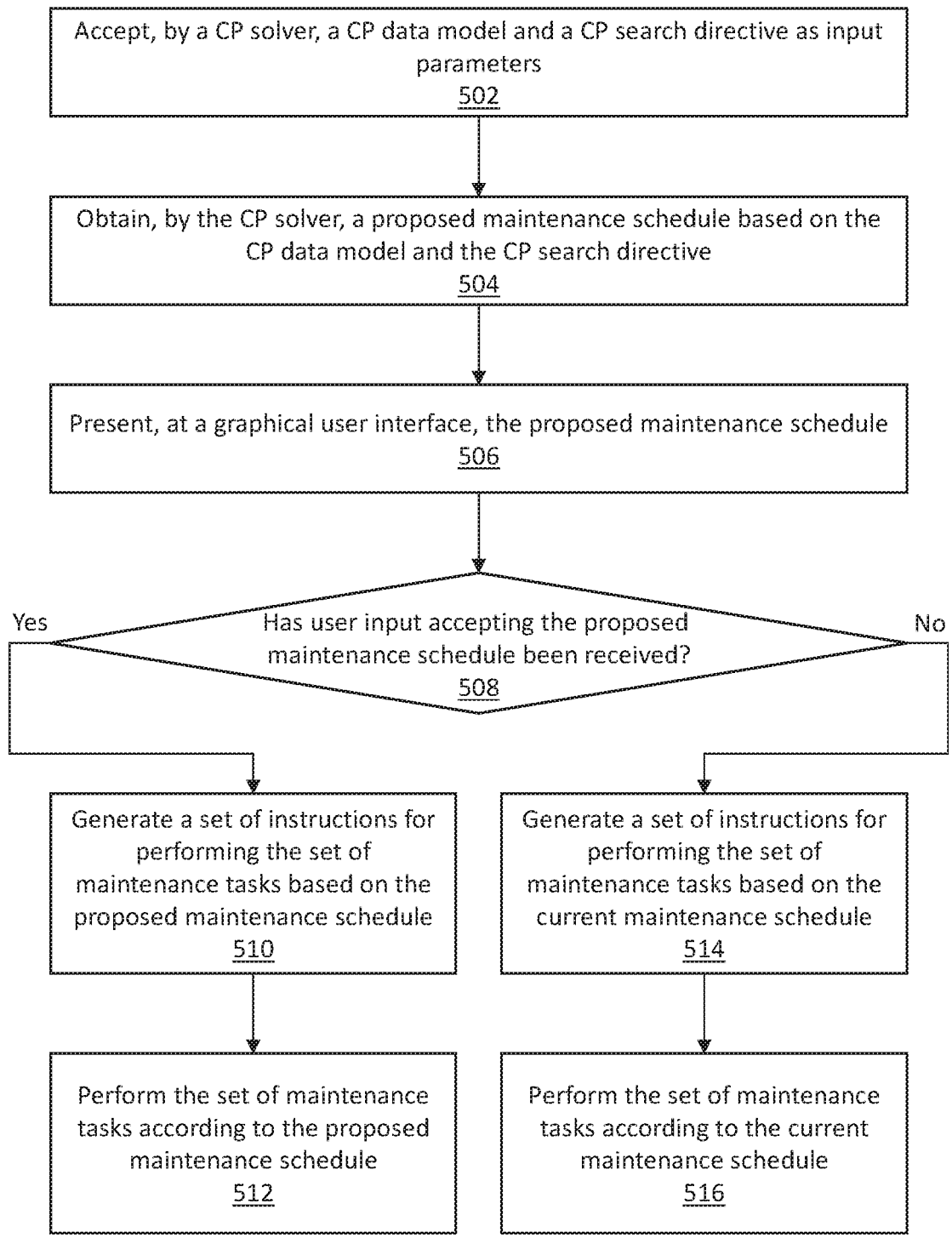
FIG. 5 illustrates an example set of operations applying a constraint programming data model and search directive to a constraint programming solver, in accordance with one or more embodiments.

D. Applying a Constraint Programming Data Model and Search Directive to a Constraint Programming Solver FIG. 5 illustrates an example set of operations applying a constraint programming data model and search directive to a constraint programming solver, in accordance with one or more embodiments.

One or more embodiments include accepting, by a CP solver, a CP data model and a CP search directive as input parameters (Operation 502). A CP solver 132 accepts a CP data model and a CP search directive as input parameters. Examples of operations for generating the CP data model are described above with reference to FIG. 3. Examples of operations for generating the CP search directive are described above with reference to FIG. 4.

One or more embodiments include obtaining, by the CP solver, a proposed maintenance schedule based on the CP data model and the CP search directive (Operation 504). The CP solver 132 applies one or more constraint programming techniques to the CP data model, guided by the CP search directive. The CP solver 132 determines a CP solution based on the CP data model and the CP search directive. The CP solution is a proposed maintenance schedule.

As an example, a CP solver may traverse each of a set of task elements specified by a CP data model to determine a CP solution. The CP solver may begin with a particular task element. A value from the domain of the particular task element is preliminarily assigned to the particular task element. If this preliminary assignment violates a constraint specified by the CP data model, then another value from the domain of the particular task element is preliminarily assigned to the particular task element. If all values from the domain of the particular task element are attempted and do not satisfy the constraint, then re-assignment of one or more task elements previously traversed is performed. In particular, a value from the domain of a previously-traversed task element was preliminarily assigned to the previously-traversed task element. Based on the need for re-assignment, another value from the domain of the previously-traversed task element is now preliminarily assigned to the previously-traversed task element. Then, assignment of the particular task element is re-attempted.

Additionally, the CP solver may be guided by a CP search directive. The CP search directive may determine a sequence in which time windows are attempted for assignment to one or more task elements. If assignment of Time Window A to a particular maintenance task is attempted before Time Window B, and a valid CP solution is found, then the assignment of Time Window A is finalized, regardless of whether assignment of Time Window B would have arrived at a valid CP solution. Hence, assignment of Time Window A is prioritized over Time Window B.

Hence, the CP solver may traverse each task element, until each task element is assigned a time window from the respective domain, without violating the constraint. The CP solver may determine the preliminary assignments as final assignments. A proposed maintenance schedule may include the final assignments of time windows to maintenance tasks.

Alternatively, the CP solver may traverse each task element, until assignment of each time window to the task elements is attempted, and yet none of the assignments satisfy the constraint. Then, the CP solver may determine that there is no valid CP solution for the CP data model. The CP solver may return an error message.

One or more embodiments include presenting, at a graphical user interface (GUI), the proposed maintenance schedule (Operation 506). A GUI 138 presents the proposed maintenance schedule determined at Operation 504. The GUI 138 may overlay the proposed maintenance schedule over a current maintenance schedule. An example GUI overlaying a proposed maintenance schedule on of a current maintenance schedule is described below with reference to FIG. 9B.

One or more embodiments include determining whether user input accepting the proposed maintenance schedule has been received (Operation 508). The GUI 138 presents an interface element configured to receive whether user input accepting, rejecting, and/or modifying the proposed maintenance schedule. The GUI 138 determines whether any such user input has been received via the interface element.

In one or more embodiments, user input accepting the proposed maintenance schedule is not necessary. The proposed maintenance schedule output from the CP solver is adopted without human intervention.

If user input has accepted the proposed maintenance schedule, one or more embodiments include generating a set of instructions for performing the set of maintenance tasks based on the proposed maintenance schedule (Operation 510). A set of instructions for performing the set of maintenance tasks based on the proposed maintenance schedule is generated.

In an embodiment, instructions for performing each maintenance task is obtained from a data repository. Additional instructions are determined, specified, and/or obtained for scheduling execution of the instructions for performing each maintenance task according to the proposed maintenance schedule. The instructions are executable by at least one device including a hardware processor.

As an example, a first maintenance task may be to update Software X on Server X The first maintenance task is implemented by a set of instructions that loads and installs Software X updates on Server X A second maintenance task may be to update Software Y on Server Y. The second maintenance task is implemented by a set of instructions that loads and installs Software Y updates on Server Y.

A master server may obtain a proposed maintenance schedule from a CP solver. The proposed maintenance schedule may indicate that the first maintenance task is scheduled for 9 am and the second maintenance task is scheduled for 10 am. Based on the proposed maintenance schedule, the master server may generate instructions for performing the first maintenance task and the second maintenance task according to the proposed maintenance schedule. The master server may generate instructions to execute the instructions of the first maintenance task (loading and installing Software X updates on Server X) at 9 am. The master server may generate instructions to execute the instructions of the second maintenance task (loading and installing Software Y updates on Server Y) at 10 am.

One or more embodiments include performing the set of maintenance tasks according to the proposed maintenance schedule (Operation 512). One or more maintenance resources accept the set of instructions generated at Operation 510. Based on the set of instructions, the maintenance resources perform the set of maintenance tasks according to the proposed maintenance schedule.

As an example, a proposed maintenance schedule may indicate that a first maintenance task is scheduled for 9 am and a second maintenance task is scheduled for 10 am. A master server may generate instructions for performing the first maintenance task at 9 am and the second maintenance task at 10 am. The master server may execute the instructions. According to the instructions, the master server may perform the first maintenance task at 9 am and the second maintenance task at 10 am.

As another example, a proposed maintenance schedule may indicate that a first maintenance task is scheduled for 9 am and a second maintenance task is scheduled for 10 am. A group of workers may view the proposed maintenance schedule at a GUI. Based on the proposed maintenance schedule, a worker may determine to perform the first maintenance task at 9 am. Another worker may determine to perform the second maintenance task at 10 am.

One or more embodiments include generating a set of instructions for performing the set of maintenance tasks based on the current maintenance schedule (Operation 514). Examples for generating a set of instructions for performing maintenance tasks based on a schedule are described above with reference to Operation 510.

One or more embodiments include performing the set of maintenance tasks according to the current maintenance schedule (Operation 516). Examples for performing the set of maintenance tasks according to a schedule are described above with reference to Operation 512.

4. Graphical User Interface for Presenting a Proposed Maintenance Schedule

Example GUIs are described below for purposes of clarity. Components and/or operations described below should be understood as specific examples which may not be applicable to certain embodiments. Accordingly, unless specifically indicated, components and/or operations described below should not be construed as limiting the scope of any of the claims.

Figure 9A:
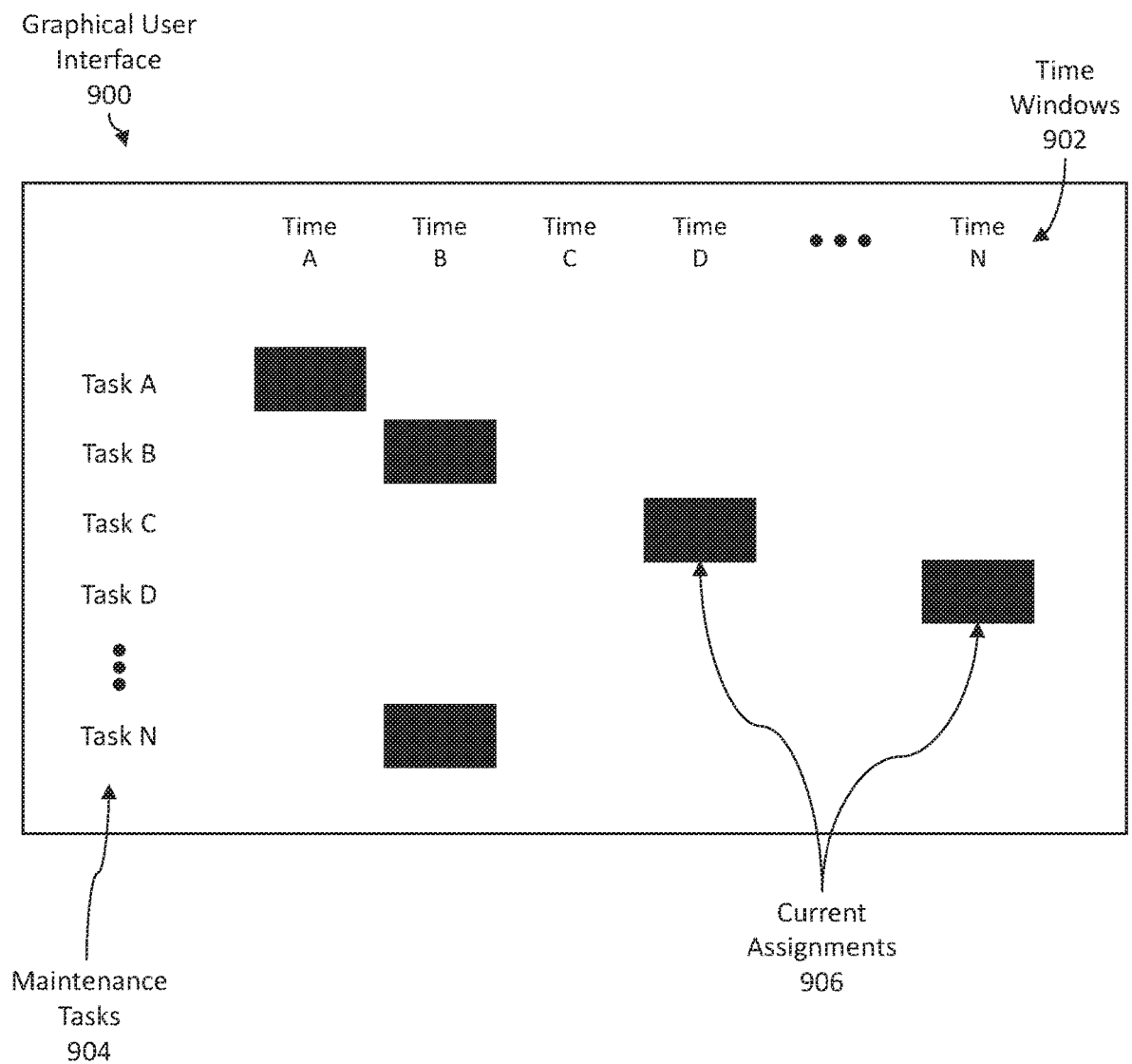
FIG. 9A illustrates an example graphical user interface indicating a current maintenance schedule for performing a set of maintenance tasks, in accordance with one or more embodiments.

FIG. 9A illustrates an example graphical user interface indicating a current maintenance schedule for performing a set of maintenance tasks, in accordance with one or more embodiments.

As illustrated, a GUI 900 presents a current maintenance schedule. The GUI 900 presents a current maintenance schedule in table form. Time windows 902 are represented by the columns of the table. Maintenance tasks 904 are presented by the rows of the table. As illustrated, time windows 902 include Time A, Time B, Time C, Time D, . . . Time N. Maintenance tasks 904 include Task A, Task B, Task C, Task D, . . . Task N.

The current maintenance schedule includes current assignments 906 of time windows 902 to maintenance task 904, as indicated by solid rectangles. Based on the current maintenance schedule, Time A is assigned to Task A. Time B is assigned to Task B and Task N. Time D is assigned to Task C. Time N is assigned to Task D.

In other embodiments, other graphics may be used to represent the current maintenance schedule and/or the current assignments.

Figure 9B:
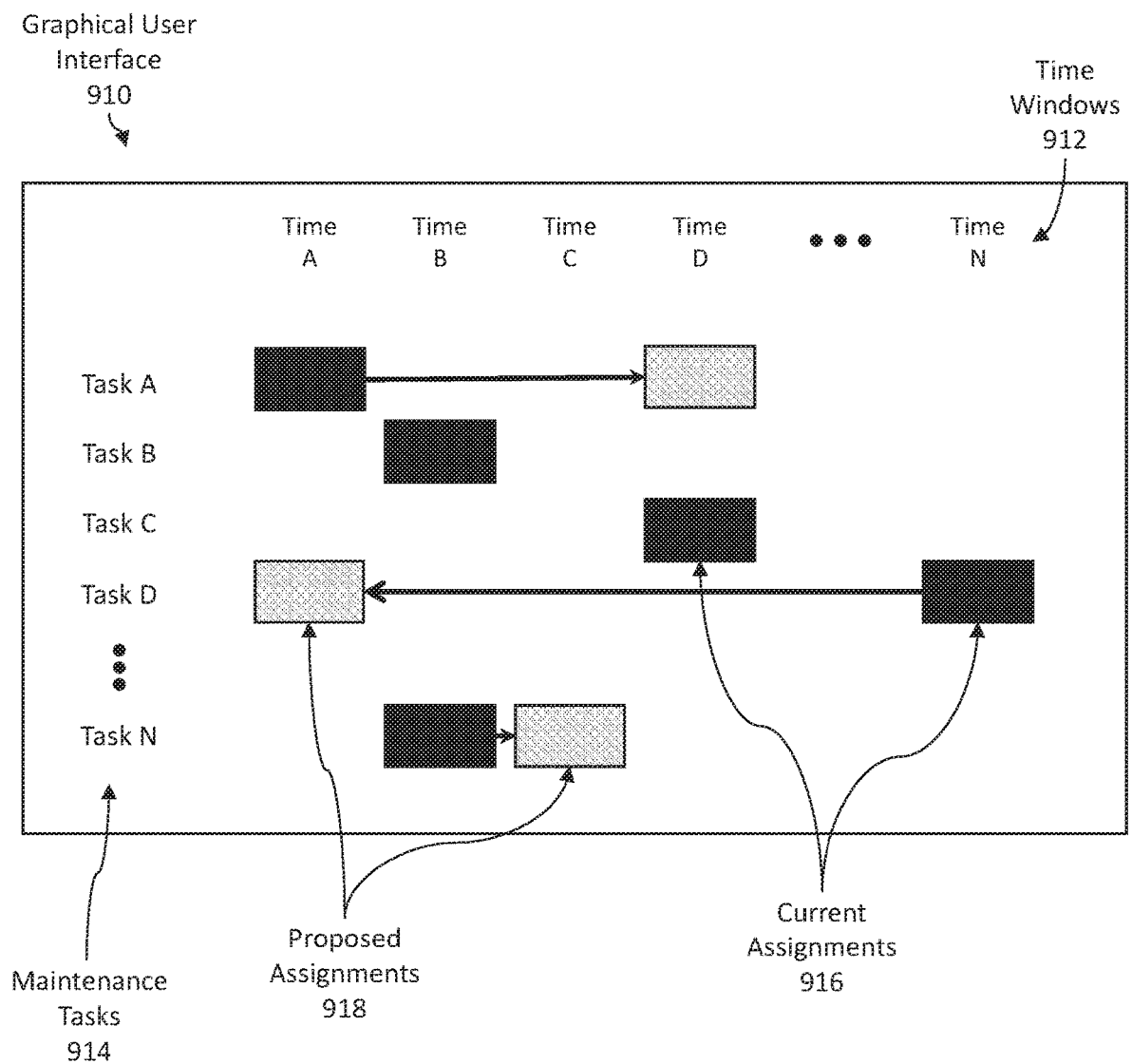
FIG. 9B illustrates an example graphical user interface overlaying a proposed maintenance schedule, on top of a current maintenance schedule, for performing a set of maintenance tasks, in accordance with one or more embodiments.

FIG. 9B illustrates an example graphical user interface overlaying a proposed maintenance schedule, on top of a current maintenance schedule, for performing a set of maintenance tasks, in accordance with one or more embodiments.

As illustrated, a GUI 910 presents a proposed maintenance schedule overlaid on a current maintenance schedule. The proposed maintenance schedule is determined by a CP solver based on a CP data model and a CP search directive. Time windows 912 are represented by the columns of the table. Maintenance tasks 914 are presented by the rows of the table. As illustrated, time windows 912 include Time A, Time B, Time C, Time D, . . . Time N. Maintenance tasks 914 include Task A, Task B, Task C, Task D, . . . Task N.

The current maintenance schedule includes current assignments 916 of time windows 912 to maintenance task 914, as indicated by solid rectangles. Based on the current maintenance schedule, Time A is assigned to Task A. Time B is assigned to Task B and Task N. Time D is assigned to Task C. Time N is assigned to Task D.

The proposed maintenance schedule includes proposed assignments 918 of time windows 912 to maintenance task 914, as indicated by dotted rectangles. If a dotted rectangle is not shown for a particular maintenance task, then the current assignment and the proposed assignment are the same for the particular maintenance task. Based on the proposed maintenance schedule, Time A is assigned to Task D. Time B is assigned to Task B. Time C is assigned to Task N. Time D is assigned to Task A and Task C.

The GUI 910 presents arrows representing modifications from the current maintenance schedule to the proposed maintenance schedule. As illustrated, the time window for Task A is modified from Time A to Time D. The time window for Task D is modified from Time N to Time A. The time window for Task N is modified from Time B to Time C.

In other embodiments, other graphics may be used to represent the current maintenance schedule, the current assignments, the proposed maintenance schedule, and/or the proposed assignments.

Based on GUI 910, a user may easily view the modifications from the current maintenance schedule to the proposed maintenance schedule. Based on the modifications, the user may make necessary changes to implement the proposed maintenance schedule. As an example, the user may rearrange maintenance resources according to the proposed maintenance schedule.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause the one or more processors to perform operations comprising:
   determining a set of machine maintenance tasks to be performed for a set of machines;
   determining a set of failure probabilities of the set of machines;
   generating a first code set specifying, in declarative form, a constraint programming data model, wherein the constraint programming data model comprises:
      a set of task elements representing the set of machine maintenance tasks, including a particular task element representing a particular machine maintenance task;
      a set of time elements representing a set of time windows, including a particular time element representing a particular time window;
      wherein a domain of the particular task element represents at least a subset of the set of time windows available for performing the particular machine maintenance task, the particular task element and the domain of the particular task element are implemented as a first set of one or more software data structures;
      wherein a domain of the particular time element represents task counts permitted during the particular time window, the particular time element and the domain of the particular time element are implemented as a second set of one or more software data structures;
      one or more constraint functions comprising a particular constraint function;
      wherein parameters into the particular constraint function include the set of task elements and the set of time elements, and the particular constraint function imposes a requirement requiring each task element, of the set of task elements, to be assigned a time window from a respective domain of each task element, such that each time element, of the set of time elements, is assigned a task count from a respective domain of each time element;
   generating a second code set specifying a constraint programming search directive, wherein the constraint programming search directive comprises:
      categorizing the set of machines into at least a first group of machines, a second group of machines, and a third group of machines based on the set of failure probabilities;
      wherein each of the first group of machines is associated with a respective failure probability within a first range of values;
      wherein each of the second group of machines is associated with a respective failure probability within a second range of values;
      wherein each of the third group of machines is associated with a respective failure probability within a third range of values;
      applying a first time window prioritization method to a first subset of the set of machine maintenance tasks for the first group of machines;
      applying a second time window prioritization method to a second subset of the set of machine maintenance tasks for the second group of machines;
      applying a third time window prioritization method to a third subset of the set of machine maintenance tasks for the third group of machines;
      wherein the first time window prioritization method, the second time window prioritization method, and the third time window prioritization method are different;
   inputting the first code set specifying the constraint programming data model and the second code set specifying the constraint programming search directive to a constraint programming solver;
   wherein the constraint programming solver is configured to determine a solution that satisfies one or more requirements imposed by the one or more constraint functions declared in the constraint programming data model;
   executing the constraint programming solver, based on the first code set specifying the constraint programming data model and the second code set specifying the constraint programming search directive, to obtain the solution, the solution comprising:
      an assignment of a first value from the domain of the particular task element to the particular task element;
      an assignment of a second value from the domain of the particular time element to the particular time element;
   wherein the solution forms a proposed machine maintenance schedule for performing the set of machine maintenance tasks;
   performing the set of machine maintenance tasks, on the set of machines, based at least on the proposed machine maintenance schedule.

2. The one or more media of claim 1, further storing instructions which, when executed by the one or more processors, cause the one or more processors to perform operations comprising:
   determining a set of delinquency costs for performing the first subset of the set of machine maintenance tasks during one or more of the set of time windows;
   wherein the first time window prioritization method comprises:
      identifying an available subset of time windows, from the set of time windows, that are available for performing a particular machine maintenance task of the first subset of the set of machine maintenance tasks;
      identifying a set of earliest time windows that are earliest out of the available subset of time windows;

determining a particular time window, of the set of earliest time windows, associated with a lowest delinquency cost for the particular machine maintenance task;

prioritizing assignment of the particular time window to the particular machine maintenance task.

3. The one or more media of claim 2, wherein the set of delinquency costs indicates a set of values of products predicted for production by the first group of machines during the one or more of the set of time windows.

4. The one or more media of claim 1, further storing instructions which, when executed by the one or more processors, cause the one or more processors to perform operations comprising:

determining a set of delinquency costs for performing the second subset of the set of machine maintenance tasks during one or more of the set of time windows;

wherein the second time window prioritization method comprises:

identifying an available subset of time windows, from the set of time windows, that are available for performing a particular machine maintenance task of the second subset of the set of machine maintenance tasks;

identifying a set of latest time windows that are latest out of the available subset of time windows;

determining a particular time window, of the set of latest time windows, associated with a lowest delinquency cost for the particular machine maintenance task;

prioritizing assignment of the particular time window to the particular machine maintenance task.

5. The one or more media of claim 1, further storing instructions which, when executed by the one or more processors, cause the one or more processors to perform operations comprising:

determining a current machine maintenance schedule for performing the third subset of the set of machine maintenance tasks, the current machine maintenance schedule indicating a respective current time window for each of the third subset of the set of machine maintenance tasks;

wherein the third time window prioritization method comprises:

identifying a particular machine maintenance task of the third subset of the set of machine maintenance tasks;

determining a particular time window that is (a) closest to the current time window for the particular machine maintenance task and (b) available to be assigned to the particular machine maintenance task;

prioritizing assignment of the particular time window to the particular machine maintenance task.

6. The one or more media of claim 5, wherein the current machine maintenance schedule is determined based at least on manuals associated with the third group of machines.

7. The one or more media of claim 1, wherein the set of machine maintenance tasks are performed by at least a second set of one or more hardware processors.

8. The one or more media of claim 1, further storing instructions which, when executed by the one or more processors, cause the one or more processors to perform operations comprising:

presenting, at a graphical user interface (GUI), a current machine maintenance schedule for performing the set of machine maintenance tasks;

overlaying the proposed machine maintenance schedule on top of the current machine maintenance schedule.

9. The one or more media of claim 1, wherein the set of machines comprises a factory machine configured to produce goods.

10. The one or more media of claim 1, wherein the set of machines comprises a computer server.

11. The one or more media of claim 1, wherein the set of failure probabilities of the set of machines is determined based at least on data detected by one or more sensors associated with the set of machines.

12. The one or more media of claim 1, further storing instructions which, when executed by the one or more processors, cause the one or more processors to perform operations comprising:

determining a set of delinquency costs for performing the set of machine maintenance tasks during one or more of the set of time windows;

determining a current machine maintenance schedule for performing the set of machine maintenance tasks, the current machine maintenance schedule indicating a respective current time window for each of the set of machine maintenance tasks;

generating a set of instructions which, when executed by a second set of one or more hardware processors, cause performance of the set of machine maintenance tasks, on the set of machines, based on the proposed machine maintenance schedule;

executing the set of instructions to perform the set of machine maintenance tasks, on the set of machines, based on the proposed machine maintenance schedule;

presenting, at a graphical user interface (GUI), the current machine maintenance schedule for performing the set of machine maintenance tasks;

overlaying the proposed machine maintenance schedule on top of the current machine maintenance schedule;

wherein the first time window prioritization method comprises:

identifying a first available subset of time windows, from the set of time windows, that are available for performing a first machine maintenance task of the first subset of the set of machine maintenance tasks;

identifying an earliest set of time windows that are earliest out of the first available subset of time windows;

determining a particular time window, of the set of earliest time windows, associated with a lowest delinquency cost for the first machine maintenance task;

prioritizing assignment of the particular time window to the first machine maintenance task;

wherein the second time window prioritization method comprises:

identifying a second available subset of time windows, from the set of time windows, that are available for performing a second machine maintenance task of the second subset of the set of machine maintenance tasks;

identifying a latest set of time windows that are latest out of the second available subset of time windows;

determining a particular time window, of the set of latest time windows, associated with a lowest delinquency cost for the second machine maintenance task;

prioritizing assignment of the particular time window to the second machine maintenance task;

wherein the third time window prioritization method comprises:
identifying a third machine maintenance task of the third subset of the set of machine maintenance tasks;
determining two time windows that are (a) closest to the current time window for the third machine maintenance task and (b) available to be assigned to the third machine maintenance task;
prioritizing assignment of a particular time window, of the two time windows, to the third machine maintenance task;
wherein the set of delinquency costs indicates a set of values of products predicted for production by the first group of machines during the one or more of the set of time windows;
wherein the current machine maintenance schedule is determined based at least on manuals associated with the set of machines;
wherein the set of machines comprises a factory machine configured to produce goods;
wherein the set of failure probabilities of the set of machines is determined based at least on data detected by one or more sensors associated with the set of machines.

13. A system, comprising:
at least one device including a hardware processor; and
the system being configured to perform operations comprising:
determining a set of machine maintenance tasks to be performed for a set of machines;
determining a set of failure probabilities of the set of machines;
generating a first code set specifying, in declarative form, a constraint programming data model, wherein the constraint programming data model comprises:
a set of task elements representing the set of machine maintenance tasks, including a particular task element representing a particular machine maintenance task;
a set of time elements representing a set of time windows, including a particular time element representing a particular time window;
wherein a domain of the particular task element represents at least a subset of the set of time windows available for performing the particular machine maintenance task, the particular task element and the domain of the particular task element are implemented as a first set of one or more software data structures;
wherein a domain of the particular time element represents task counts permitted during the particular time window, the particular time element and the domain of the particular time element are implemented as a second set of one or more software data structures;
one or more constraint functions comprising a particular constraint function;
wherein parameters into the particular constraint function include the set of task elements and the set of time elements, and the particular constraint function imposes a requirement requiring each task element, of the set of task elements, to be assigned a time window from a respective domain of each task element, such that each time element, of the set of time elements, is assigned a task count from a respective domain of each time element;

generating a second code set specifying a constraint programming search directive, wherein the constraint programming search directive comprises:
categorizing the set of machines into at least a first group of machines, a second group of machines, and a third group of machines based on the set of failure probabilities;
wherein each of the first group of machines is associated with a respective failure probability within a first range of values;
wherein each of the second group of machines is associated with a respective failure probability within a second range of values;
wherein each of the third group of machines is associated with a respective failure probability within a third range of values;
applying a first time window prioritization method to a first subset of the set of machine maintenance tasks for the first group of machines;
applying a second time window prioritization method to a second subset of the set of machine maintenance tasks for the second group of machines;
applying a third time window prioritization method to a third subset of the set of machine maintenance tasks for the third group of machines;
wherein the first time window prioritization method, the second time window prioritization method, and the third time window prioritization method are different;
inputting the first code set specifying the constraint programming data model and the second code set specifying the constraint programming search directive to a constraint programming solver;
wherein the constraint programming solver is configured to determine a solution that satisfies one or more requirements imposed by the one or more constraint functions declared in the constraint programming data model;
executing the constraint programming solver, based on the first code set specifying the constraint programming data model and the second code set specifying the constraint programming search directive, to obtain the solution, the solution comprising:
an assignment of a first value from the domain of the particular task element to the particular task element;
an assignment of a second value from the domain of the particular time element to the particular time element;
wherein the solution forms a proposed machine maintenance schedule for performing the set of machine maintenance tasks;
performing the set of machine maintenance tasks, on the set of machines, based on the proposed machine maintenance schedule.

14. The system of claim 13, wherein:
the operations further comprise: determining a set of delinquency costs for performing the first subset of the set of machine maintenance tasks during one or more of the set of time windows;
the first time window prioritization method comprises:
determining a set of earliest time windows, from the set of time windows, available for performing a particular machine maintenance task of the first subset of the set of machine maintenance tasks;

determining a particular time window, of the set of earliest time windows, associated with a lowest delinquency cost for the particular machine maintenance task;
prioritizing assignment of the particular time window to the particular machine maintenance task.

15. The system of claim 13, wherein:
the operations further comprise: determining a set of delinquency costs for performing the second subset of the set of machine maintenance tasks during one or more of the set of time windows;
the second time window prioritization method comprises:
determining a set of latest time windows, from the set of time windows, available for performing a particular machine maintenance task of the second subset of the set of machine maintenance tasks;
determining a particular time window, of the set of latest time windows, associated with a lowest delinquency cost for the particular machine maintenance task;
prioritizing assignment of the particular time window to the particular machine maintenance task.

16. The system of claim 13, wherein the operations further comprise:
determining a current machine maintenance schedule for performing the third subset of the set of machine maintenance tasks, the current machine maintenance schedule indicating a respective current time window for each of the third subset of the set of machine maintenance tasks;
wherein the third time window prioritization method comprises:
identifying a particular machine maintenance task of the third subset of the set of machine maintenance tasks;
determining a particular time window that is (a) closest to the current time window for the particular machine maintenance task and (b) available to be assigned to the particular machine maintenance task;
prioritizing assignment of the particular time window to the particular machine maintenance task.

17. A method, comprising:
determining a set of machine maintenance tasks to be performed for a set of machines;
determining a set of failure probabilities of the set of machines;
generating a first code set specifying, in declarative form, a constraint programming data model, wherein the constraint programming data model comprises:
a set of task elements representing the set of machine maintenance tasks, including a particular task element representing a particular machine maintenance task;
a set of time elements representing a set of time windows, including a particular time element representing a particular time window;
wherein a domain of the particular task element represents at least a subset of the set of time windows available for performing the particular machine maintenance task, the particular task element and the domain of the particular task element are implemented as a first set of one or more software data structures;
wherein a domain of the particular time element represents task counts permitted during the particular time window, the particular time element and the domain of the particular time element are implemented as a second set of one or more software data structures;
one or more constraint functions comprising a particular constraint function;
wherein parameters into the particular constraint function include the set of task elements and the set of time elements, and the particular constraint function imposes a requirement requiring each task element, of the set of task elements, to be assigned a time window from a respective domain of each task element, such that each time element, of the set of time elements, is assigned a task count from a respective domain of each time element;
generating a second code set specifying a constraint programming search directive, wherein the constraint programming search directive comprises:
categorizing the set of machines into at least a first group of machines, a second group of machines, and a third group of machines based on the set of failure probabilities;
wherein each of the first group of machines is associated with a respective failure probability within a first range of values;
wherein each of the second group of machines is associated with a respective failure probability within a second range of values;
wherein each of the third group of machines is associated with a respective failure probability within a third range of values;
applying a first time window prioritization method to a first subset of the set of machine maintenance tasks for the first group of machines;
applying a second time window prioritization method to a second subset of the set of machine maintenance tasks for the second group of machines;
applying a third time window prioritization method to a third subset of the set of machine maintenance tasks for the third group of machines;
wherein the first time window prioritization method, the second time window prioritization method, and the third time window prioritization method are different;
inputting the first code set specifying the constraint programming data model and the second code set specifying the constraint programming search directive to a constraint programming solver;
wherein the constraint programming solver is configured to determine a solution that satisfies one or more requirements imposed by the one or more constraint functions declared in the constraint programming data model;
executing the constraint programming solver, based on the first code set specifying the constraint programming data model and the second code set specifying the constraint programming search directive, to obtain the solution, the solution comprising:
an assignment of a first value from the domain of the particular task element to the particular task element;
an assignment of a second value from the domain of the particular time element to the particular time element;
wherein the solution forms a proposed machine maintenance schedule for performing the set of machine maintenance tasks;

performing the set of machine maintenance tasks, on the set of machines, based on the proposed machine maintenance schedule;

wherein the method is performed by at least one device including a hardware processor.

18. The method of claim 17, further comprising:

determining a set of delinquency costs for performing the first subset of the set of machine maintenance tasks during one or more of the set of time windows;

wherein the first time window prioritization method comprises:

determining a set of earliest time windows, from the set of time windows, available for performing a particular machine maintenance task of the first subset of the set of machine maintenance tasks;

determining a particular time window, of the set of earliest time windows, associated with a lowest delinquency cost for the particular machine maintenance task;

prioritizing assignment of the particular time window to the particular machine maintenance task.

19. The method of claim 17, further comprising:

determining a set of delinquency costs for performing the second subset of the set of machine maintenance tasks during one or more of the set of time windows;

wherein the second time window prioritization method comprises:

determining a set of latest time windows, from the set of time windows, available for performing a particular machine maintenance task of the second subset of the set of machine maintenance tasks;

determining a particular time window, of the set of latest time windows, associated with a lowest delinquency cost for the particular machine maintenance task;

prioritizing assignment of the particular time window to the particular machine maintenance task.

20. The method of claim 17, further comprising:

determining a current machine maintenance schedule for performing the third subset of the set of machine maintenance tasks, the current machine maintenance schedule indicating a respective current time window for each of the third subset of the set of machine maintenance tasks;

wherein the third time window prioritization method comprises:

identifying a particular machine maintenance task of the third subset of the set of machine maintenance tasks;

determining a particular time window that is (a) closest to the current time window for the particular machine maintenance task and (b) available to be assigned to the particular machine maintenance task;

prioritizing assignment of the particular time window to the particular machine maintenance task.

\* \* \* \* \*